US011355091B2

(12) United States Patent
Lee et al.

(10) Patent No.: US 11,355,091 B2
(45) Date of Patent: *Jun. 7, 2022

(54) ELECTRONIC DEVICE INCLUDING FLEXIBLE DISPLAY AND CONTENT DISPLAY METHOD THEREOF

(71) Applicant: SAMSUNG ELECTRONICS CO., LTD., Suwon-si (KR)

(72) Inventors: Sang-young Lee, Anyang-si (KR); Kyu-hyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,354

(22) Filed: Feb. 3, 2021

(65) Prior Publication Data
US 2021/0158783 A1 May 27, 2021

Related U.S. Application Data

(63) Continuation of application No. 15/040,027, filed on Feb. 10, 2016, now Pat. No. 10,937,393.
(Continued)

(30) Foreign Application Priority Data

May 20, 2015 (KR) ........................ 10-2015-0070513

(51) Int. Cl.
*G09G 5/38* (2006.01)
*G09G 5/34* (2006.01)
(Continued)

(52) U.S. Cl.
CPC ............. *G09G 5/38* (2013.01); *G06F 1/1652* (2013.01); *G06F 3/147* (2013.01); *G09G 3/035* (2020.08);
(Continued)

(58) Field of Classification Search
CPC ....... G06F 11/652; G06F 11/626; G09G 5/34; G09G 5/38; G09G 2380/02;
(Continued)

(56) References Cited

U.S. PATENT DOCUMENTS 7,957,051 B2   6/2011   Touwslager et al.
8,174,628 B2   5/2012   Matsushita et al.
(Continued)

FOREIGN PATENT DOCUMENTS

KR   10-2008-0018162 A   2/2008
KR   10-2010-0014414 A   2/2010
(Continued)

OTHER PUBLICATIONS

Communication dated Mar. 22, 2021 issued by the Korean Intellectual Property Office in counterpart English Korean Application No. 10-2015-0070513.
(Continued)

*Primary Examiner* — Todd Buttram
(74) *Attorney, Agent, or Firm* — Sughrue Mion, PLLC

(57) ABSTRACT

An electronic device includes a main body; a flexible display to be rolled up and placed in the main body; a sensor configured to detect unrolling of the flexible display; and a controller configured. The controller is configured to control the flexible display to present information while the flexible display is exposed from the main body, and, based on detecting the flexible display being rolled into the main body while the information is presented, control to change a presentation position of the information on the flexible display according to the rolling of the flexible display.

10 Claims, 23 Drawing Sheets

Related U.S. Application Data

(60) Provisional application No. 62/147,832, filed on Apr. 15, 2015.

(51) Int. Cl.
| | | |
|---|---|---|
| *G06F 1/16* | (2006.01) | |
| *G09G 5/00* | (2006.01) | |
| *G06F 3/147* | (2006.01) | |
| *G09G 3/20* | (2006.01) | |
| *G09G 3/00* | (2006.01) | |

(52) U.S. Cl.
CPC ........... *G09G 3/2003* (2013.01); *G09G 5/006* (2013.01); *G09G 5/34* (2013.01); *G09G 2310/04* (2013.01); *G09G 2340/0464* (2013.01); *G09G 2340/14* (2013.01); *G09G 2340/145* (2013.01)

(58) Field of Classification Search
CPC ... G09G 2340/0464; G09G 2340/0471; G09G 2340/0478; G09G 2340/0485
See application file for complete search history.

(56) References Cited

U.S. PATENT DOCUMENTS

| | | | |
|---|---|---|---|
| 9,104,376 B2 | 8/2015 | Song et al. | |
| 9,262,059 B2 | 2/2016 | Kim et al. | |
| 9,703,323 B2 | 7/2017 | Song et al. | |
| 10,241,542 B2 | 3/2019 | Kwak et al. | |
| 10,802,544 B2 | 10/2020 | Kwak et al. | |
| 10,937,393 B2* | 3/2021 | Lee .......................... | G06F 3/147 |
| 2009/0051830 A1 | 2/2009 | Matsushita et al. | |
| 2010/0056223 A1* | 3/2010 | Choi ..................... | H04M 1/724 |
| | | | 455/566 |
| 2010/0142029 A1 | 6/2010 | Touwslager et al. | |
| 2011/0227822 A1 | 9/2011 | Shai | |
| 2012/0212433 A1* | 8/2012 | Lee ......................... | G06F 3/041 |
| | | | 345/173 |
| 2013/0154970 A1 | 6/2013 | Seo et al. | |
| 2013/0275910 A1 | 10/2013 | Kim et al. | |
| 2014/0028596 A1* | 1/2014 | Seo ........................ | G06F 3/0481 |
| | | | 345/173 |
| 2014/0049463 A1* | 2/2014 | Seo ......................... | G06F 3/016 |
| | | | 345/156 |
| 2014/0118317 A1* | 5/2014 | Song ....................... | G09G 5/14 |
| | | | 345/204 |
| 2014/0375702 A1* | 12/2014 | Cho ....................... | G06F 3/0483 |
| | | | 345/690 |
| 2014/0380186 A1* | 12/2014 | Kim ...................... | G06F 1/1624 |
| | | | 715/746 |
| 2015/0153777 A1* | 6/2015 | Liu ........................ | G06F 1/1652 |
| | | | 345/173 |
| 2015/0206169 A1* | 7/2015 | Ye ...................... | G06Q 30/0242 |
| | | | 705/14.41 |
| 2015/0220118 A1 | 8/2015 | Kwak et al. | |
| 2015/0277443 A1* | 10/2015 | Beltran .............. | G05B 19/4062 |
| | | | 318/566 |
| 2015/0331454 A1 | 11/2015 | Song et al. | |
| 2016/0307545 A1* | 10/2016 | Lee ....................... | G09G 3/2003 |
| 2019/0155476 A1 | 5/2019 | Kim et al. | |
| 2019/0227599 A1 | 7/2019 | Kwak et al. | |
| 2021/0026413 A1 | 1/2021 | Kwak et al. | |
| 2021/0158783 A1* | 5/2021 | Lee .......................... | G09G 5/34 |

FOREIGN PATENT DOCUMENTS

| | | |
|---|---|---|
| KR | 10-2012-0095019 A | 8/2012 |
| KR | 10-2014-0017391 A | 2/2014 |
| KR | 10-2014-0055854 A | 5/2014 |
| KR | 10-2014-0146992 A | 12/2014 |
| KR | 10-2014-0147497 A | 12/2014 |

OTHER PUBLICATIONS

Communication dated Sep. 28, 2021, issued by the Korean Intellectual Property Office in Korean Application No. 10-2015-0070513.

Communication dated Mar. 28, 2022 issued by the Korean Intellectual Property Office in counterpart English Korean Application No. 10-2015-0070513.

\* cited by examiner

ELECTRONIC DEVICE INCLUDING FLEXIBLE DISPLAY AND CONTENT DISPLAY METHOD THEREOF

CROSS-REFERENCE TO RELATED APPLICATIONS

This is a continuation of U.S. application Ser. No. 15/040,027 filed Feb. 10, 2016, which is based on and claims benefit of U.S. Patent Application No. 62/147,832 filed Apr. 15, 2015, and is based on and claims priority from Korean Patent Application No. 10-2015-0070513 filed in the Korean Intellectual Property Office on May 20, 2015. The disclosures of the above-named applications are incorporated herein by reference in their entireties.

BACKGROUND

1. Field

Methods and apparatuses consistent with exemplary embodiments broadly relate to an electronic device including a flexible display and a content display method thereof, and more particularly, to a method for naturally displaying content on a display area that expands as a flexible display mounted on an electronic device such that it is withdrawable or retractable from a main body.

2. Description of the Related Art

Various types of displays are being developed. Recently, in order to satisfy users' needs for novel functions and wide variety of functions, flexible displays have been developed. A flexible display has a characteristic of being rollable like paper. This type of flexible display may be referred to as a rollable display.

This type of flexible display may be used in an electronic device such as a TV, a mobile device, tablet PC and the like. For example, a flexible display may be mounted on a main body of a TV such that it may be withdrawable or retractable, thereby realizing a wall-mountable TV. When the TV is turned off, the flexible display may be rolled into the main body of the TV, thereby not exposing a display area to outside or exposing only a small portion of the display area to the outside. When the TV is turned on, the flexible display may be withdrawn or retracted from the main body of the TV, exposing the display area of the flexible display to the outside. In order to withdraw or retract the flexible display from the main body of the TV, a user's force may be used to pull the flexible display or a driver may be used configured to automatically withdraw or retract the flexible display from the main body of the TV.

As the flexible display is withdrawn or retracted from the main body of the TV, the display area may expand.

SUMMARY

In an electronic device that includes a flexible display mounted on a main body of a TV such that it may be withdrawn or retracted, in a case of displaying a content on a display area while the display area expands, there occurs a problem that a position of the content being displayed on the display area changes as the display area expands.

An electronic device of an exemplary embodiment configured to scroll the content being displayed on the display area according to a speed and a direction of the withdrawal or retraction of the flexible display such that the portion of the content being displayed may gradually change proportional to the change in the display area as it expands or retracts.

According to an exemplary embodiment, there is provided an electronic device including a main body; a flexible display to be rolled up, wherein the rolled-up flexible display is placed in the main body; a sensor configured to detect unrolling of the flexible display; and a controller configured to control the flexible display to present information, and control to change a presentation position of the information on the flexible display in a direction opposite to a unrolling direction of the flexible display.

The electronic device may further include a motor and a driver configured to drive the motor to unroll the flexible display, and the controller may control the driver and the motor.

The controller may determine a speed of the unrolling of the flexible display based on the signal output from the sensor, and determine a speed of the changing of the presentation position of the information based on the determined speed of the unrolling.

The controller may determine an amount of the unrolling of the flexible display based on the signal output from the sensor, and determine an amount of the changing of the presentation position of the information based on the determined amount of the unrolling.

The controller may determine whether to display the information on the flexible display from a top end or from a bottom end of the information according to at least one attribute of the information.

In response to an amount of the unrolling corresponding to a threshold value, the controller may provide a feedback message.

The threshold value may include a first value and a second value, and the controller may provide a first feedback message indicating the first value in response to the amount of the unrolling exceeding the first value, and may provide a second feedback message corresponding to the second value in response to the amount of the unrolling exceeding the second value.

The feedback message may be a visual feedback, and the controller may control the flexible display to display a line corresponding to the threshold value.

In response to the flexible display being rolled, the controller may control the flexible display to change the presentation position of the information displayed on the flexible display in an opposite direction to a direction in which the flexible display is being rolled, and to display a black screen on an area of the flexible display which is rolled into the main body.

In response to the flexible display being rolled, the controller may changes the presentation position of the information displayed on the flexible display in an opposite direction to a direction in which the flexible display is being rolled, and turn off an area of the flexible display which is inside the main body.

According to yet another exemplary embodiment, there is provided a content display method of an electronic device, the method including detecting a flexible display being unrolled from a main body; determining a unrolling of the flexible display; presenting information on the flexible display; and changing the presentation position of the information on the flexible display in a direction opposite to a unrolling direction of the flexible display.

The method may further include determining a speed of the unrolling of the flexible display; and determining a speed of the changing of the presentation position of the information based on the determined speed of the unrolling.

The method may further include determining an amount of the changing of the presentation position of the information based on an amount of the unrolling.

The method may further include determining whether to display the information on the flexible display from a top end or from a bottom end according to one or more attributes of the information.

The method may further include, in response to an amount of the unrolling corresponding to a threshold value, providing a feedback message.

The threshold value may include a first value and a second value, and the providing a feedback may involve providing a first feedback message indicating the first value in response to the amount of the unrolling exceeding the first value, and providing a second feedback message indicating the second value in response to the amount of the unrolling exceeding the second value.

The feedback message may be a visual feedback, and the providing the feedback message may involve displaying a line corresponding to the threshold value on the flexible display.

The method may further include detecting the flexible display being rolled; and changing the presentation position of the information displayed on the flexible display in an opposite direction to a direction in which the display is being rolled.

The method may further include displaying a black screen on an area of the flexible display which is rolled into the main body.

The method may further include turning off an area of the flexible display which is inside the main body.

The unrolling includes one of: the flexible display being unrolled downward or upward outside the main body; and the flexible display being unrolled in right or left direction outside the main body.

The main body includes a first portion storing a first portion of the flexible display and a second portion storing a second portion of the flexible display and the unrolling of the flexible display includes moving the first portion of the main body and the second portion of the main body in opposite directions such that the flexible display is unrolled between the first portion and the second portion of the main body.

An electronic device of an exemplary embodiment may include a main body, a flexible display electrically or manually connected to the main body and mounted such that it may be retracted or rolled out of the main body, a sensor configured to sense a retraction of the display, and a controller configured to determine an amount or a direction of retraction of the display based on a signal output from the sensor, and to control the display to scroll content being displayed on the display in an opposite direction to the retraction direction based on the amount of the retraction of the flexible display, thereby expanding the displaying of the content proportional to the expansion of the display area as the display is rolled or retracted outside or inside the main body.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
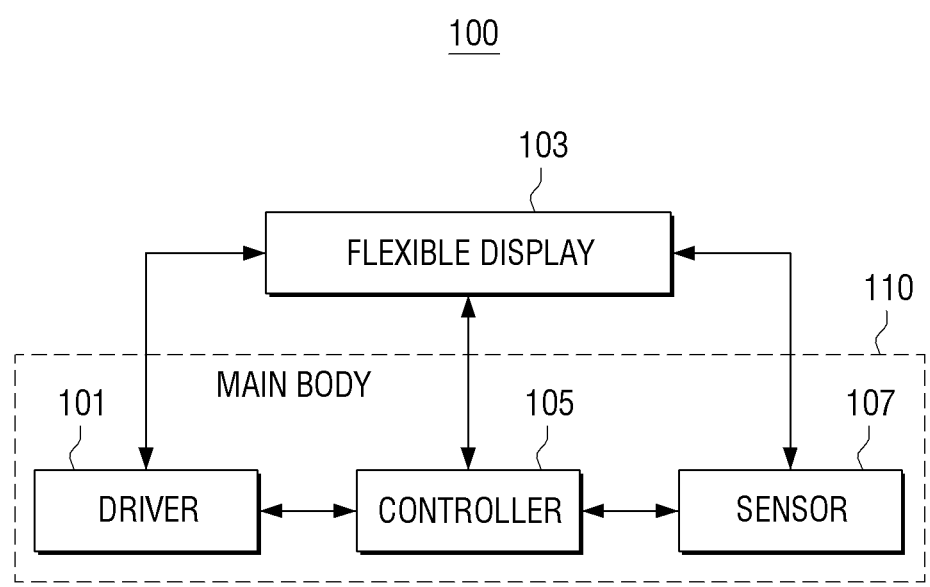
FIG. 1 is a block diagram illustrating an electronic device according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Terms such as '1st', '2nd', 'first' and 'second' may be used to describe various components, but without limitation and regardless of their order and/or priority. These terms are used merely for the purpose of differentiating a component from other components. For example, a first user device and a second user device may represent different user devices regardless of their order and/or priority. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "has/have", "may have", "include/comprise" or "including/comprising" used in the specification indicate the existence of certain characteristics (for example: a numerical value, function, operation, or component), which does not exclude the possibility of existence of other characteristics.

In the present specification, expressions such as "A or B", "at least one of A or/and B", and "one or more of A or/and B" may include any possible combination of the components following those expressions. For example, "A or B", "at least one of A and B", and "at least one of A or B" may indicate all of the following: (1) including at least one A, (2) including at least one B, or (3) including at least one A and at least one B.

It is also noted that in the present specification, "connected", or "(operatively or communicatively) coupled with/to" refers to one component (for example: first component) not only directly coupling another component (for example: second component) but also indirectly coupling the other component through an intermediate component (for example: third component). On the other hand, "directly connected/directly coupled" refers to one component directly coupling another component without an intermediate component.

In the present specification, "configured (or set) to~" may be changed to "suitable for~", "having the capacity to~", "designed to~", "adapted to~", "made to", or "capable of~". The phrase "configured (or set) to~" may not mean only "specifically designed to~". In some cases, the term "a device configured to~" may mean that the device is "capable of~" together with other devices or components. For example, "a processor configured (or set) to perform A, B, and C" may mean an exclusive processor (for example: embedded processor) for performing certain operations or a generic-purpose processor (for example: CPU or application processor) for performing certain operations by executing one or more software programs stored in a memory device.

In the exemplary embodiment, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Content may be a video, a still image, text, a graphic object or a webpage being displayed on a display area of a flexible display. The content may be just one content or include a plurality of contents.

To retract and/or retractable in an exemplary embodiment means moving a display outside of the main body. These movements include the display being unrolled out of the main body in any direction including upward, downward, left or right or a combination of these directions. Further, retract or unrolling may include continuous or stop and go movement of the display to the outside of the body.

A display area of a flexible display is an area being withdrawn from a main body thus being exposed to outside. It may be referred to as a screen. That is, hereinafter, a display area and a screen may be used to refer to the same element and may be used interchangeably.

The terms used in the present specification were used merely to explain certain exemplary embodiments, but not to limit the present disclosure to the certain exemplary embodiments. A singular form may include a plural form as long as it is not specifically mentioned otherwise in the context. All the terms used herein including technical and scientific terms may have the same meanings as would be generally understood by those skilled in the related art, and unless clearly defined otherwise, the terms should not be interpreted ideally or overly formerly. In some cases, even the terms defined in the present specification cannot be interpreted to exclude exemplary embodiments disclosed herein.

Hereinafter, one or more exemplary embodiments will be explained in detail with reference to the attached drawings.

FIG. 1 is a block diagram illustrating an electronic device 100 according to an exemplary embodiment. FIG. 1 illustrates a main body 110 and a flexible display 103 of the electronic device 100. The electronic device 100 may be a TV, a mobile phone, a tablet PC or the like. The main body 110 may include a driver 101, a controller 105, and a sensor 107. Furthermore, the main body 110 may be provided with an accompanying space for accompanying the flexible display 103.

The flexible display 103 may be mounted such that it is rollable into the main body 110 or withdrawable or retractable or unrollable from the main body 110. The flexible display 103 may be driven by the driver 101 and be withdrawn or retracted from the main body 110 automatically. Furthermore, the flexible display 103 may be withdrawn or retracted from the main body 110 manually. When the flexible display 103 is withdrawn or retracted from the main body 110, a display area may be exposed to the outside. The display area is a part of the flexible display 103 withdrawn from the main body 110 and exposed to the outside. On the other hand, a part of the flexible display 103 rolled into the main body 110 may be referred to as a screen off area. That is, the flexible display 103 may include a screen off area and display area in which the image is being shown, viewable area.

The flexible display 103 may be rolled up, the rolled-up flexible display may be placed in the main body.

A size of the display area may change according to an amount of withdrawal or retractability of the flexible display 103 from the main body 110 according to an exemplary embodiment. Furthermore, a size of the screen off area may change according to an amount of withdrawal or retraction from the main body 110 according to an exemplary embodiment.

The driver 101 may withdraw or retract the flexible display 103. The driver 101 may include an actuator, and the flexible display 103 may be withdrawn or retracted outside the main body 110 by the actuator. For example, the driver 101 may include a motor and gear, and the motor may be rotated by the control of the controller 10 so as to withdraw the flexile display 103. As the motor is rotated, the flexible display 103 may be rolled or unrolled, and withdrawn or retracted from the main body 110.

The sensor 107 may sense a withdrawal/retractability and/or an amount of withdrawal or retraction of the flexible display 103. The sensor 107 may detect rolling or unrolling of the flexible display. Examples of the sensor 107 that may be used herein include an optical sensor, a gyro sensor, a proximity sensor, and an encoder. The optical sensor may be a barcode sensor configured to recognize a barcode printed on the flexible display 103 and sense a withdrawal/retraction and an amount of withdrawal or retraction of the flexible display 103. Furthermore, the optical sensor may recognize a color pattern or black and white pattern printed on the flexible display 103 so as to sense a withdrawal/retraction and/or an amount of withdrawal or retraction of the flexible display 103.

The gyro sensor may be mounted on the flexible display 103, and a signal being output from the gyro sensor may change according to the amount of withdrawal or the amount of retraction of the flexible display 103.

The encoder may output an electric signal based on a number of rotations of the motor. The amount of withdrawal or retraction changes according to the number of rotations of the motor, and the amount of withdrawal or retraction of the flexible display 103 may be measured from the signal output from the encoder.

The controller 105 may control the overall operations of the electronic device, and determine the amount of withdrawal or retraction or unrolling of the flexible display 103 based on the signal output from the sensor 107. A method for determining the amount of withdrawal or retraction or unrolling of the flexible display 103 according to various exemplary embodiments will be explained later with reference to FIGS. 16 to 20.

The controller 105 may control the content being displayed on the display area of the flexible display 103 to be scrolled in an opposite direction to the withdrawal direction of the flexible display based on the amount of withdrawal or retraction of the flexible display 103.

The controller 105 may control the flexible display to present information, and control to change a presentation area of the information on the flexible display in a direction opposite to a rolling or unrolling direction of the flexible display.

As the flexible display 103 is withdrawn or retracted, a size of the display area of the flexible display 103 changes. The controller 105 may measure an amount and speed of withdrawal or retraction of the flexible display 103 based on the signal being output from the sensor 107. The controller 105 may scroll the content being displayed on the flexible display 103 in an opposite direction to the withdrawal direction of the flexible display 103 based on the amount and speed of withdrawal or retraction of the flexible display 103. For example, in response to the flexible display 103 being withdrawn or retracted in a downward direction, the controller 105 may scroll or move the content being displayed on the flexible display 103 in an upward direction that is the opposite direction to the withdrawal direction of the flexible display 103. Herein, the speed of the scroll or move of the content may be proportionate to the withdrawal or retraction speed of the flexible display 103. For example, if the speed of withdrawal or retraction of the flexible display 103 is 0.5 m/sec, the speed of scroll or move of the content may be 0.5 m/sec.

That is, the controller 105 measures the speed at which the flexible display 103 is withdrawn or retracted, and controls the content being displayed on the display area. The controller 105 may calculate the number of pixels that should be moved in the display area according to a refresh rate and move a position of a screen layout in an opposite direction to which the flexible display 103 expands.

Figure 2:
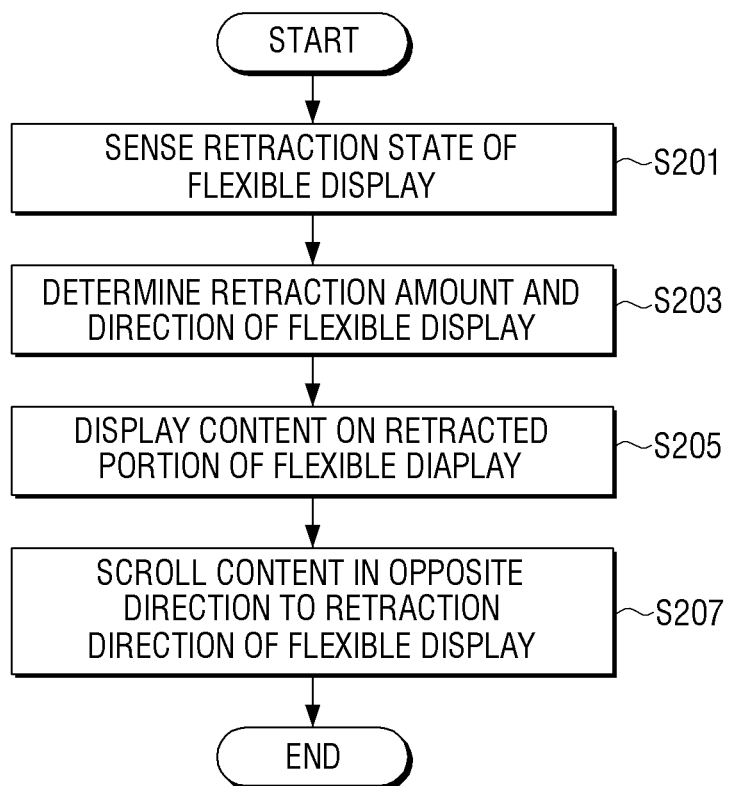
FIG. 2 is a flowchart illustrating a method of displaying a content according to a withdrawal or retraction of a flexible display of an electronic device according to an exemplary embodiment.

FIG. 2 is a flowchart illustrating a method of displaying content according to a withdrawal or retraction of the flexible display 103 of the electronic device 100 according to an exemplary embodiment.

When the power of the electronic device 100 is turned on, the controller 105 senses an initial position of the flexible display 103. The flexible display 103 may be completely rolled into the main body 110 of the electronic device 100, leaving no area exposed to the outside. Otherwise, the flexible display 103 may be partially exposed to the outside of the main body 110 of the electronic device 100. The controller 105 senses the withdrawal or retraction state of the flexible display 103 based on the signal output from the sensor 107 (in operation S201), according to an exemplary embodiment. Furthermore, the controller determines an amount and direction of the withdrawal or retraction of the flexible display 103 based on the signal output from the sensor 107 (in operation S203). In order to determine the initial amount of withdrawal or retraction of the flexible display 103 with the power turned on, the controller 105 may receive the signal output from the sensor 107 and determine the initial amount of the withdrawal or retraction. In response to having a pattern on the flexible display 103 for sensing the amount of withdrawal or retraction, the controller 105 may analyze pattern information scanned by the sensor 107 and determine the amount of withdrawal or retraction of the flexible display 103.

For example, when the flexible display 103 is withdrawn or retracted from the main body 110 before the electronic device 100 is turned on, in response to the power of the electronic device 100 being turned on, the controller 105 may receive information about the pattern of the flexible display 103 output from the sensor 107, and determine that the amount of withdrawal or retraction of the current flexible display 103 is 20 cm.

The controller 105 determines the amount of withdrawal or retraction of the flexible display 103 according to an exemplary embodiment, and determines a size of the display area according to the amount of withdrawal or retraction determined. In response to the size of the display area being determined, the controller 105 displays content on the flexible display 103 based on the area of the flexible display 103 (in operation S205). For example, in response to the total size of the flexible display 103 being 55 inches (length: 68 cm), and a length of the current flexible display withdrawn or retracted being 20 cm, the controller 105 may control the flexible display 103 to display on the screen the content corresponding to 20 cm from the top end from among the entire content.

The controller 105 may control the driver 101 to withdraw or retract the flexible display 103. The controller 105 may sense the speed and direction of withdrawal or retraction of the flexible display 103 based on the signal output from the sensor 107. For example, the controller 105 may measure a number of rotations of the motor from the signal output from the encoder, and determine the speed, direction, and amount of withdrawal or retraction of the flexible display 103.

As the flexible display 103 is withdrawn, the amount of withdrawal may change continuously, and the size of the display area may continue to change accordingly. The controller 105 may determine the speed, direction, and amount of withdrawal of the flexible display 103 based on the signal output from the sensor 107, and scroll the content being displayed on the flexible display 103 in an opposite direction to the withdrawal direction of the flexible display 103 according to the speed, direction, and amount of withdrawal or retraction of the flexible display 103 (in operation S207). For example, in response to the flexible display 103 being withdrawn or retracted in a downward direction at a speed of 0.5 m/sec, the controller 105 may scroll the content being displayed on the flexible display 103 in an upward direction at the speed of 0.5 m/sec. That is, in an exemplary embodiment, the speed of moving or scrolling the content is based on the speed of withdrawing or retraction of the flexible display 103. For example, the speed of moving or scrolling the content may be proportional to the speed of withdrawing or retraction of the flexible display 103 in a 1:1 correspondence. This is provided by way of an example only and not by way of a limitation. Other relationships may also be set up.

The controller 105 may determine the speed of withdrawal or retraction of the flexible display 103 based on the signal output from the sensor 107, and may determine or calculate a speed of scroll or movement of the content based on the determined speed of withdrawal or retraction.

In response to the amount of withdrawal or retraction being determined, the controller 105 may determine or calculate the amount of scroll or movement of the content based on the determined amount of withdrawal or retraction. The content may have an attribute, and the controller 105 may determine whether to display the content from the top end or from the bottom end according to the attribute of the content, in an exemplary embodiment.

When the amount of withdrawal or retraction increases as the flexible display 103 is withdrawn or retracted, and the amount of withdrawal or retraction reaches a threshold value, the controller 105 may provide a feedback corresponding to the threshold value, according to an exemplary embodiment.

The threshold value may include a first value and a second value, and in response to the amount of withdrawal or retraction being more than the first value, the controller 105 may provide feedback corresponding to the first value, and in response to the amount of withdrawal being more than the second value, the controller 105 may provide feedback corresponding to the second value, according to an exemplary embodiment.

In an exemplary embodiment, the feedback is a visual feedback, and in response to the display area of the flexible display 103 expanding so as to reach the first value, the controller 105 may control the flexible display 103 to display a line corresponding to the first value as the visual feedback, and in response to the display area of the flexible display 103 expanding to so as to reach the second value, the controller 015 may control the flexible display 103 to display a line corresponding to the second value as the visual feedback.

For example, in response to the display area of the flexible display expanding such that a width of the display area satisfies a width:length ratio of 4:3, the controller 105 may control the flexible display 103 to display a line surrounding the display area corresponding to the ratio of 4:3 on the display area. In response to the display area of the flexible display 103 expanding continuously such that a width of the display area satisfies a width:length ratio of 16:9, the controller 105 may control the flexible display 103 to display a line surrounding the display area corresponding to the ratio of 16:9 on the display area, but the visual feedback is not limited to above-described exemplary embodiment.

In response to the flexible display 103 being rolled, the controller 105 senses the rolling of the flexible display 103. The controller 105 may sense the rolling of the flexible display 103 based on the signal output from the sensor 107. In response to the flexible display 103 being rolled into the main body 110, the controller 105 may scroll the content being displayed on the flexible display 103 in an opposite direction to the direction in which the flexible display 103 is being rolled. The controller 105 may control the flexible display 103 to display a black screen on an area of the flexible display 103 rolled into the main body 110 that is thus not exposed to the outside. Furthermore, the controller 105 may control the flexible display 103 to turn off a screen of the area of the flexible display 103 rolled into the main body that is thus not exposed to the outside.

Figure 3:
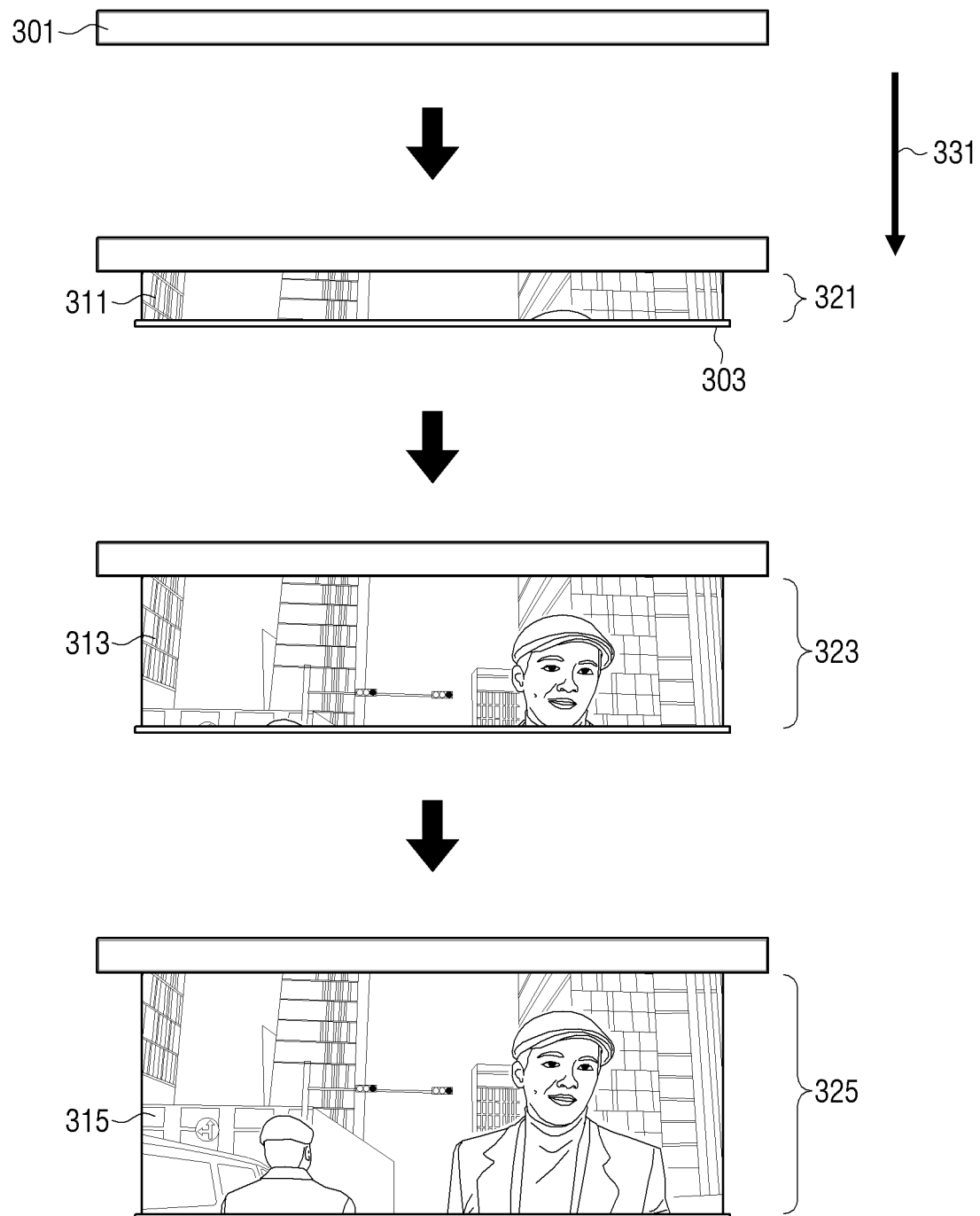
FIG. 3 is a view illustrating a process of displaying content on a display area according to a withdrawal or retraction of a flexible display of an electronic device according to an exemplary embodiment.

FIG. 3 is a view illustrating a process of displaying content on a screen according to an amount of withdrawal or retraction of a flexible display of an electronic device according to an exemplary embodiment.

FIG. 3 illustrates the main body 301 and the flexible display 303. A size 311, 313, 315 of content being displayed on the flexible display 310 may change according to the amount of withdrawal or retraction of the flexible display 303. FIG. 3 illustrates a state where, the flexible display 303 is not exposed outside of the main body 301 for example when the power of the electronic device is turned off, a state where the flexible display 303 is withdrawn or retracted outside of the main body 301 by about 30 cm (321), a state where the flexible display 303 is withdrawn or retracted outside of the main body 301 by about 70 cm (323), and a state where the flexible display 303 is withdrawn or retracted outside of the main body 301 by about 105 cm (325). When the flexible display 303 is completely exposed or extracted outside of the main body 301, the length of the display area may be 105 cm. The length of the display area of the flexible display 303 may be the same or smaller than the length of withdrawal or retraction of the flexible display 303, according to an exemplary embodiment.

In response to the power of the electronic device being turned on, the flexible display 303 may be withdrawn or retracted outside of the main body 301, and the display area may be exposed to the outside and expanded accordingly. As the display area expands, the size 311, 313, 315 of the content being displayed on the display area may change.

For example, in response to an entire size of the display area being 85 inches (length: 105 cm), the length of the content being displayed on the display area may be 105 cm.

When the power is turned on and the flexible display 303 starts to be withdrawn or retracted by a rotation of the motor, the display area may expand, and the size of the content being displayed on the display area may change accordingly. On the display area, the content may be displayed from the top end, and as the flexible display 303 is withdrawn or retracted in a downward direction 331, as shown in FIG. 3, the content being displayed on the display area may be scrolled in an opposite direction to the withdrawal or retraction direction of the flexible display 303, that is, in an upward direction.

For example, in response to the flexible display 303 being withdrawn or retracted in a downward direction by about 30 cm, content 311 having a length of 30 cm may be displayed on the display area. Herein, on the display area, a content of a length of 30 cm may be displayed. Herein, the entirety of the content 311, the content of a length of 30 cm from the top end may be displayed on the display area.

In response to the flexible display 303 being withdrawn or retracted in a downward direction by about 70 cm (323), the content may be scrolled in an upward direction so that the content 313 of a length of 70 cm may be displayed on the display area. In an exemplary embodiment, the content 313 having a length of 70 cm from the top end may be displayed on the display area.

In response to the flexible display 303 being withdrawn in a downward direction by about 105 cm (325), the content may be scrolled in an upward direction so that the content 315 of a length of 105 cm may be displayed on the display area. In an exemplary embodiment the content having a length of 105 cm from the top end may be displayed on the display area.

For the content being displayed on the display area to appear natural even though the flexible display has been withdrawn or retracted and the display area has expanded, a movement speed of the flexible display or expansion speed of the display area must correspond to the scroll speed of the content. That is, the speed at which the flexible display is withdrawn or retracted must be the same or about the same as the speed at which the content being displayed on the display area moves.

Table 1 is a list of the number of pixels that must be moved per frame according to different sizes of displays, in a case where a resolution of the flexible display is MD (Full High Definition), according to an exemplary embodiment.

TABLE 1

| Screen size | Diagonal line | Length | Pixel per cm | Time-based | Speed-based |
| --- | --- | --- | --- | --- | --- |
| 55-Inch | 138 cm | 68 cm | 15.88235294 | 9 | 13.23529412 |
| 65-Inch | 163 cm | 80 cm | 13.5 | 9 | 11.25 |
| 75-Inch | 189 cm | 93 cm | 11.61290323 | 9 | 9.677419355 |
| 85-Inch | 214 cm | 105 cm | 10.28571429 | 9 | 8.571428571 |

For example, in response to the size of the flexible display being 55 inches, the number of pixels in a width direction is 1920, the number of pixels in a length direction is 1080, a diagonal length is 138 cm, and the length is 68 cm. When time-based, there exist 15.88235294 pixels per 1 cm. In response to the withdrawal or retraction speed of the flexible display being 1 m/sec and the number of frames of the content being displayed per second being 120, the content must be moved by about 13 pixels each time one frame is displayed. That is, the content being displayed on the display area must be moved by 11 pixels at a time in an upward direction per 0.0083 second. Furthermore, in response to the withdrawal or retraction time of the flexible display being 1 second, and the number of frames of the content being displayed per second being 120, the content must be moved in an upward direction by 9 pixels each time one frame is displayed. That is, the content being displayed on the display area must be moved by 9 pixels at a time in an upward direction per 0.0083 second. Herein, the withdrawal or retraction speed of the flexible display is 0.68 m/sec.

According to another exemplary embodiment, in response to the resolution of the flexible display being MD (Full High Definition) and the size of the flexible display being 65 inches, the number of pixels in the width direction is 1920, the number of pixels in the length direction is 1080, the diagonal length is 168 cm, and the length is 80 cm. When length based, there exists 13.5 pixels per 1 cm. In response to the withdrawal or retraction speed of the flexible display being 1 m/sec and the number of frames of the content being displayed per second being 120, the content must be moved by about 11 pixels each time one frame is displayed. That is, the content displayed on the display area must be moved by about 11 pixels in an upward direction per 0.0083 second. Furthermore, in response to the withdrawal or retraction time of the flexible display being 1 second, and the number of frames of the content being displayed per 1 second being 120, the content must be moved in an upward direction by 9 pixels at a time every time one frame is displayed. That is, the content being displayed on the display area must be moved by 9 pixels in an upward direction per 0.0083 second. According to an exemplary embodiment, the withdrawal or retraction speed of the flexible display is 0.8 m/sec.

Table 2 shows a list of the number of pixels that must be moved per frame according to different sizes of displays in a case where the resolution of the flexible display is UHD (Ultra High Definition).

TABLE 2

| Screen size | Diagonal line | Length | Pixel per cm | Time-based | Speed-based |
| --- | --- | --- | --- | --- | --- |
| 55-Inch | 138 cm | 68 cm | 31.76470588 | 18 | 26.47058824 |
| 65-Inch | 163 cm | 80 cm | 27 | 18 | 22.5 |
| 75-Inch | 189 cm | 93 cm | 23.22580645 | 18 | 19.35483871 |
| 85-Inch | 214 cm | 105 cm | 20.57142857 | 18 | 17.14285714 |

In response to the size of the flexible display being 75 inches, the number of pixels in the width direction is 3840, the number of pixels in the length direction is 2160, diagonal line is 189 cm, and the length is 93 cm. When length based, there exist 23.22580645 pixels per 1 cm. In response to the withdrawal or retraction speed of the flexible display being 1 m/sec and the number of frames of the content being displayed per second being 120, the content must be moved by about 19 pixels each time one frame is displayed. That is, the content being displayed on the display area must be moved by about 19 pixels in an upward direction per 0.0083 second. Furthermore, in response to the withdrawal or retraction time of the flexible display being 1 second, and the number of frames of the content being displayed per second being 120, the content must be moved by 18 pixels each time one frame is displayed. That is, the content being displayed on the display area must be moved by 18 pixels in an upward direction per 0.0083 second. According to an exemplary embodiment, the withdrawal or retraction speed of the flexible display is 0.93 m/sec.

In response to the size of the flexible display being 86 inches, the number of pixels in the width direction is 3840, the number of pixels in the length direction is 2160, the diagonal line is 214 cm, and the length is 105 cm. When length based, there exist 20.57142857 pixels per 1 cm. In response to the withdrawal or retraction speed of the flexible display being 1 m/sec, and the number of frames of the content being displayed per second being 120, the content must be moved by about 17 pixels each time one frame is displayed. That is, the content being displayed on the display area must be moved by about 17 pixels in an upward direction per 0.0083 second. Furthermore, in response to the withdrawal time of the flexible display being 1 second, and the number of frames of the content being displayed per second being 120, the content must be moved by 18 pixels each time one frame is displayed. That is, the content being displayed on the display area must be moved by 18 pixels in an upward direction per 0.0083 second. Herein, the withdrawal or retraction speed of the flexible display is 1.05 m/sec.

Figure 4:
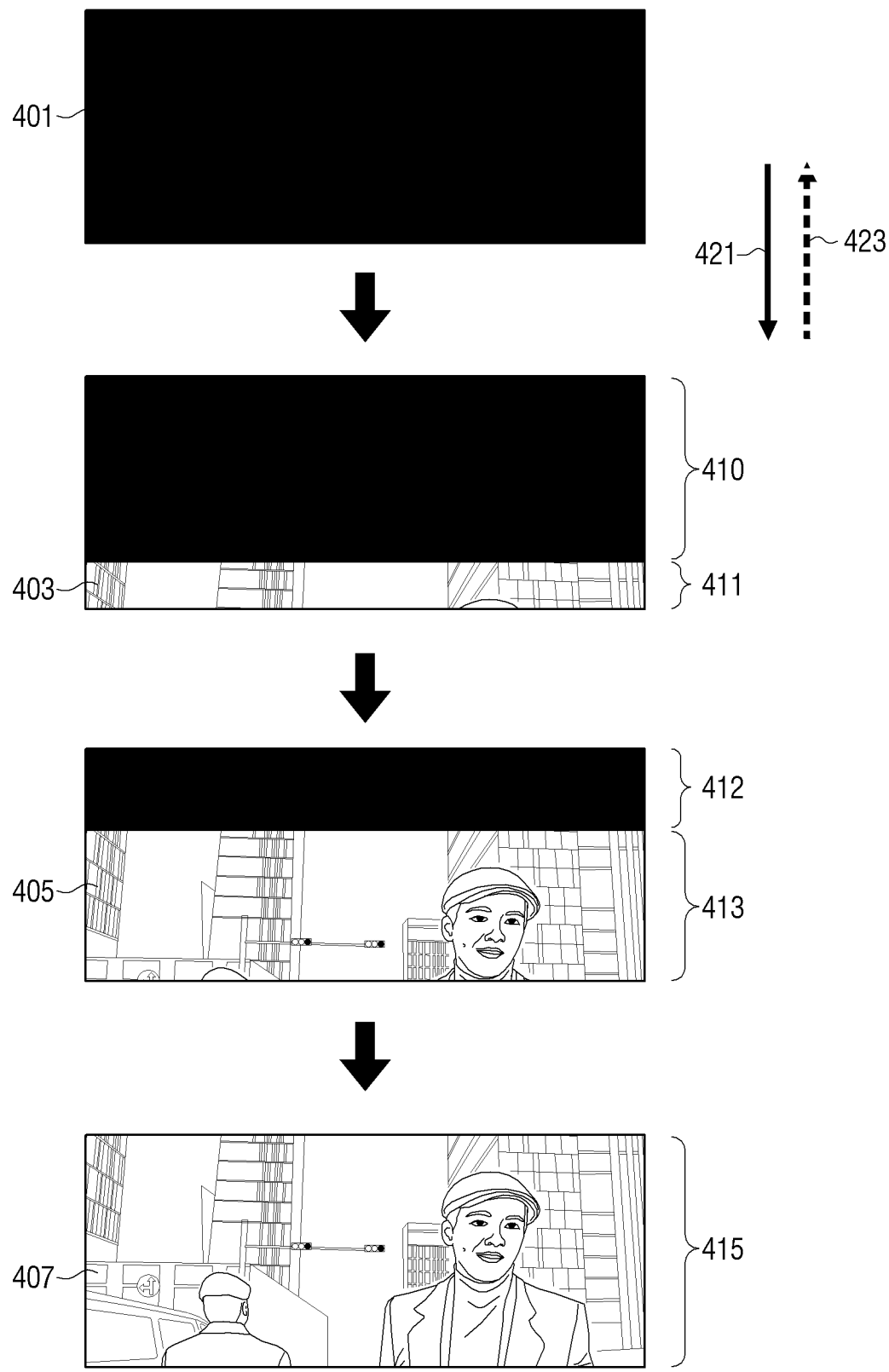
FIG. 4 is a view illustrating a display area of a flexible display of an electronic device expanding as the flexible display is being withdrawn or retracted according to an exemplary embodiment.

FIG. 4 is a view illustrating the display area of the flexible display 303 expanding as the flexible display 303 of the electronic device 100 is withdrawn or retracted according to an exemplary embodiment.

In the first view of FIG. 4, content is not displayed on the display area 401 of the flexible display 303. That is, the flexible display 303 may be rolled up inside the main body 301 and/or the power of the electronic device may be turned off.

In the second view of FIG. 4, there may be a display area 411 and screen off area 410 of the flexible display 303. Furthermore, the screen off area 410 may display a black screen. As the flexible display 303 is withdrawn or retracted in a downward direction 421, the content 403 is scrolled in an upward direction 423 and the display area 411 expands. The content 403 is displayed from the bottom end of the display area 411, and as the flexible display 303 is withdrawn or retracted, the content 403 may be scrolled in an upward direction 423. Furthermore, the screen off area 410 may be gradually reduced as the content 403 is scrolled in an upward direction 423.

In the third view of FIG. 4, there may be a display area 413 and a screen off area 412 of the flexible display 303. Furthermore, the screen off area 412 may display a black screen. As the flexible display 303 is further withdrawn or retracted in a downward direction 421, the content 405 is further scrolled in an upward direction 423 and the display area 413 further expands. The content 405 is displayed from the bottom end of the display area 413, and as the flexible display 303 is withdrawn or retracted, the content 405 may be scrolled in an upward direction 423. Furthermore, as the content 405 is scrolled in an upward direction 423, the screen off area 412 may further be gradually reduced.

In the fourth view of FIG. 4, the flexible display 303 is completely withdrawn to the outside the main body 301, and there may only be the display area 415 on the flexible display 303 showing content 407.

Figure 5:
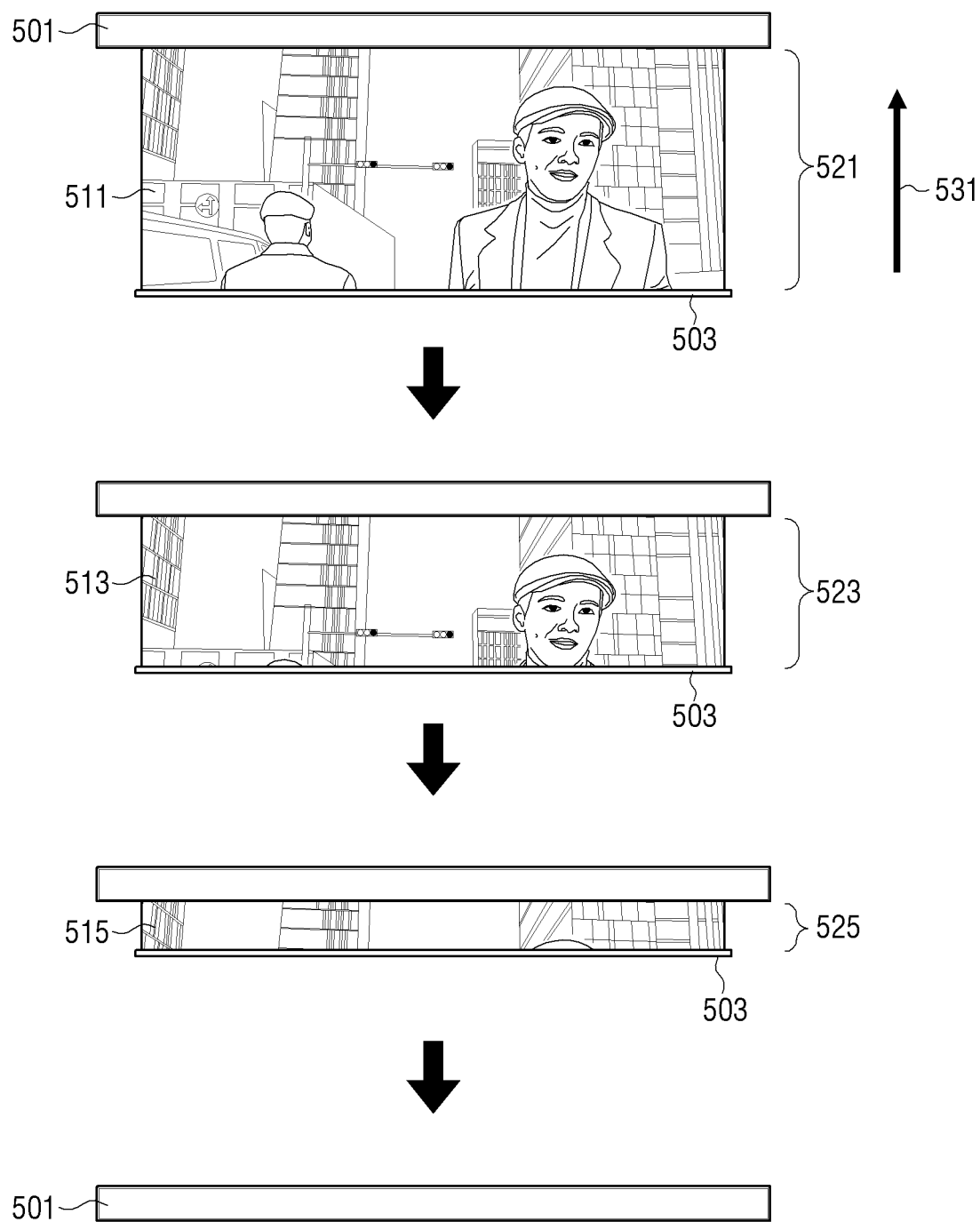
FIG. 5 is a view illustrating a process of content disappearing from a display area as a flexible display of an electronic device is being rolled into or retracted back according to an exemplary embodiment.

FIG. 5 is a view illustrating a process of the content disappearing as the flexible display is rolled back into the main body of an electronic device according to an exemplary embodiment.

In the first view of FIG. 5, the flexible display 503 is completely withdrawn or retracted to the outside of the main body 501, and the content 511 may be displayed on the entire display area of the flexible display 503.

In the case where the flexible display 503 is rolled back into the main body 501, the flexible display 503 may be gradually rolled into the main body 501, and accordingly, the display area may be reduced. As the display area is reduced, the content being displayed on the screen may be reduced or scrolled up in an opposite direction to the direction of movement of the flexible display 503. That is, the content being displayed on the screen may be scrolled in a downward direction according to an exemplary embodiment.

The second view of FIG. 5 is a view illustrating a part of the flexible display 503 being rolled back into the main body 501. As the flexible display 503 is rolled back into the main body 501, a part of the flexible display 503 is rolled into the main body 501, and accordingly the display area 523 is reduced. For example, when a size of the entire display area of the flexible display 503 is 85 inches and the length is 105 cm, the length of the display area 523 may be 70 cm (reduced from the length of 105 cm). According to an exemplary embodiment, only 70 cm length of the entire content 513 is displayed on the screen. That is, as the content is scrolled in a downward direction, a part of the entire content disappears, and only 70 cm from the top end may be displayed.

The third view of FIG. 5 is a view illustrating the flexible display 503 being further rolled into the main body 501. As the flexible display 503 is further rolled continuously, a part of the flexible display 503 is further rolled into the main body 501, and accordingly, the display area 525 is reduced. For example, when the entire display area of the flexible display 503 is 85 inches and the length is 105 cm, the length of the display area 525 may be reduced to 30 cm. According to an exemplary embodiment, only 30 cm length content 515 from the top end from among the entire content may be displayed. That is, the content may be scrolled in a downward direction, and a part of the entire content may be scrolled up and disappear, displaying only 30 cm length of content from the top end.

The fourth view of FIG. 5 is a view illustrating the flexible display 503 being completely rolled into the main body 501. As the flexible display 503 is completely rolled into the main body 501, the flexible display is not exposed to the outside, the display area disappears, and the content displayed on the screen disappears as well.

Figure 6:
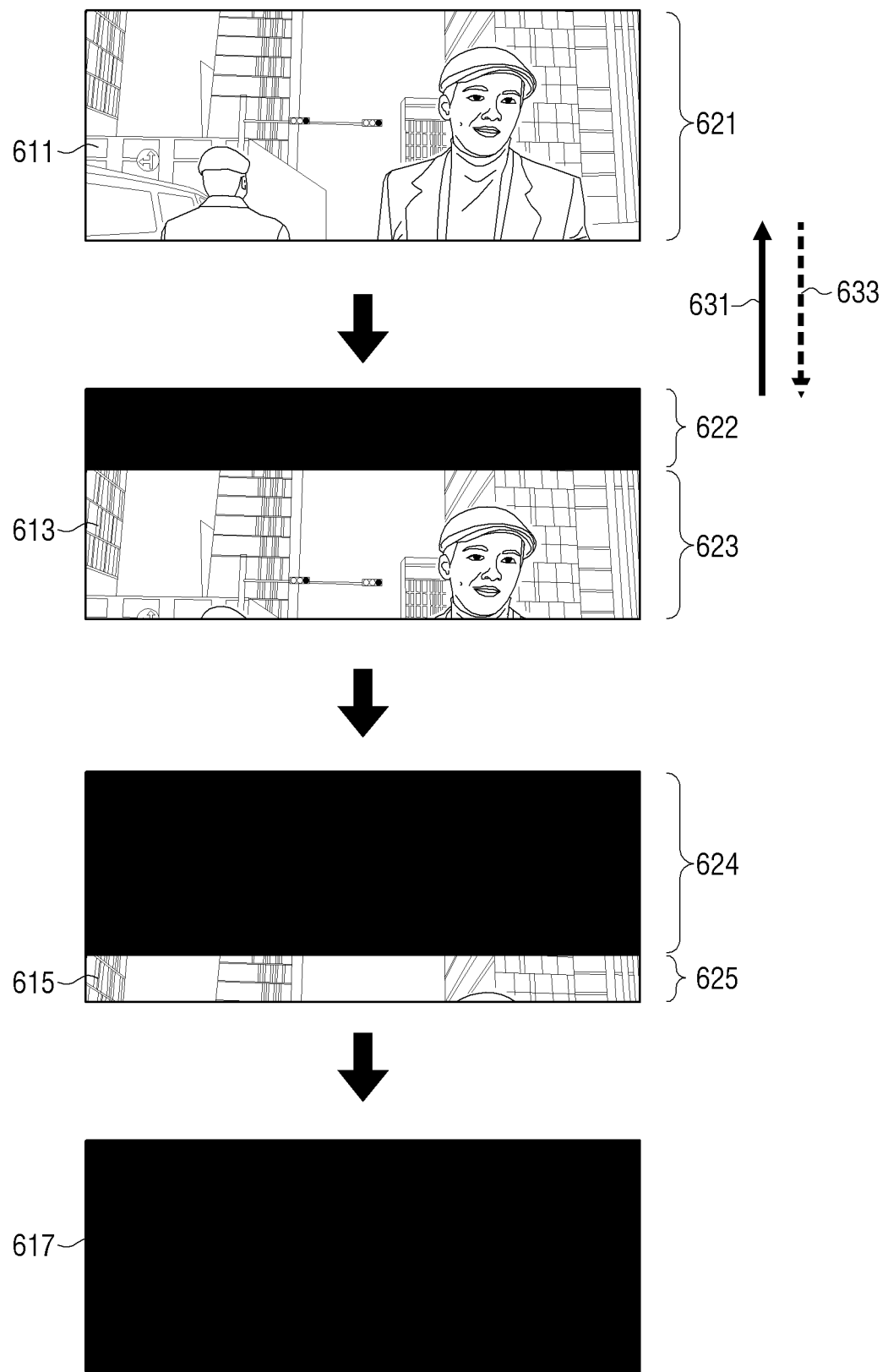
FIG. 6 is a view illustrating a process of content disappearing from a flexible display of an electronic device as the flexible display is being rolled into or retracted back according to an exemplary embodiment.

FIG. 6 is a view illustrating a process of content disappearing from the flexible display 503 as the flexible display 503 is rolled back into the main body of the electronic device 100 according to an exemplary embodiment.

In the first view of FIG. 6, the flexible display 503 may be completely withdrawn or retracted outside of the main body 501, and there may be only the display area 621 of the flexible display 503. That is, the entire flexible display 503 may be the display area 621, and the content 611 may be displayed in its full size on the screen. For example, when the size of the entire content 611 is 85 inches, the length of the content 611 may be 105 cm.

In an exemplary embodiment, when the flexible display 503 is rolled into the main body, the flexible display 503 may be rolled into the main body 501, and accordingly, the display area 621 may be reduced. As the display area 621 is reduced, the content being displayed on the screen may be scrolled in an opposite direction 633 to the direction of movement 631 of the flexible display. That is, the content displayed on the screen may be scrolled in a downward direction 633.

In the second view of FIG. 6, a display area 623 and screen off area 622 of the flexible display 503 may be provided. Furthermore, a black screen may be displayed on the screen off area 622. As the flexible display 503 is rolled back in an upward direction 631, the content 613 is scrolled in a downward direction 633, and the display area 623 is reduced. As the flexible display 503 is rolled into the main body, the content 613 may be scrolled in a downward direction 633. Furthermore, the screen off area 622 may gradually expand as the content 613 is scrolled in a downward direction 633.

In the third view of FIG. 6, a display area 625 and screen off area 624 of the flexible display 503 may be provided. Furthermore, a black screen may be displayed on the screen off area 624. As the flexible display 503 is further rolled back into the main body in an upward direction 631, the content 615 is further scrolled in a downward direction 633, and the display area 625 is further reduced. Furthermore, the screen off area 624 may further expand gradually as the content 615 is scrolled in a downward direction 633.

In the fourth view of FIG. 6, the flexible display 503 may be completely rolled into the main body 501, and only the screen off area 617 may exist of the flexible display 503.

Figure 7:
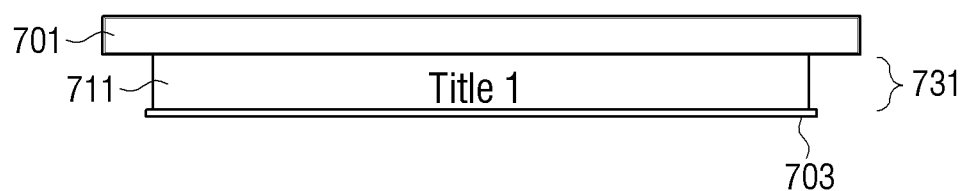
FIGS. 7 and 8 are views illustrating a process of displaying content on a flexible display of an electronic device as the flexible display is being withdrawn or retracted according to another exemplary embodiment.
Figure 7:
Figure 7:
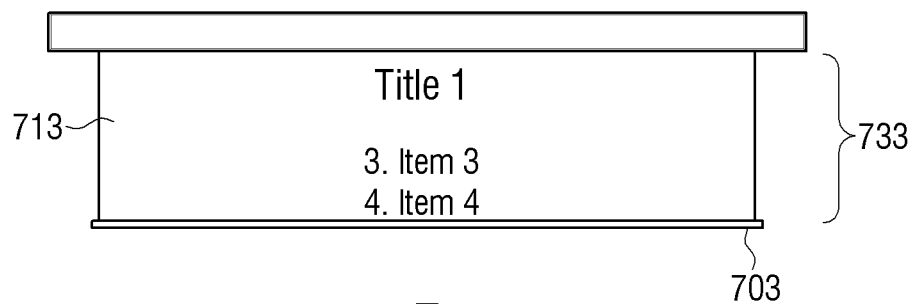
Figure 7:
Figure 7:
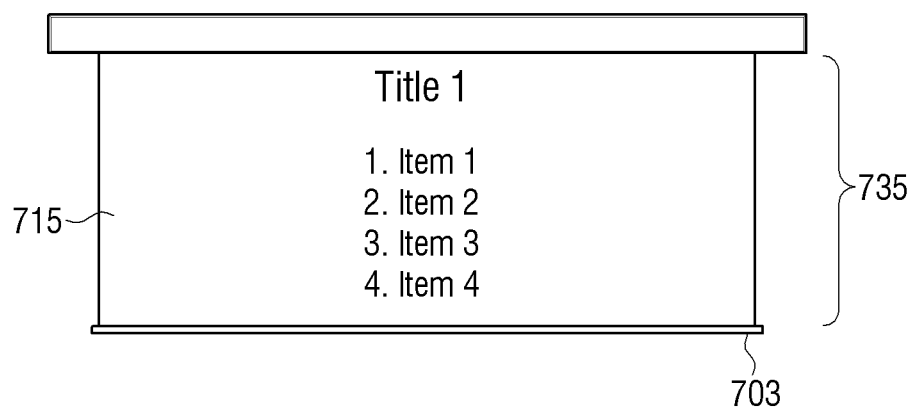
Figure 8:
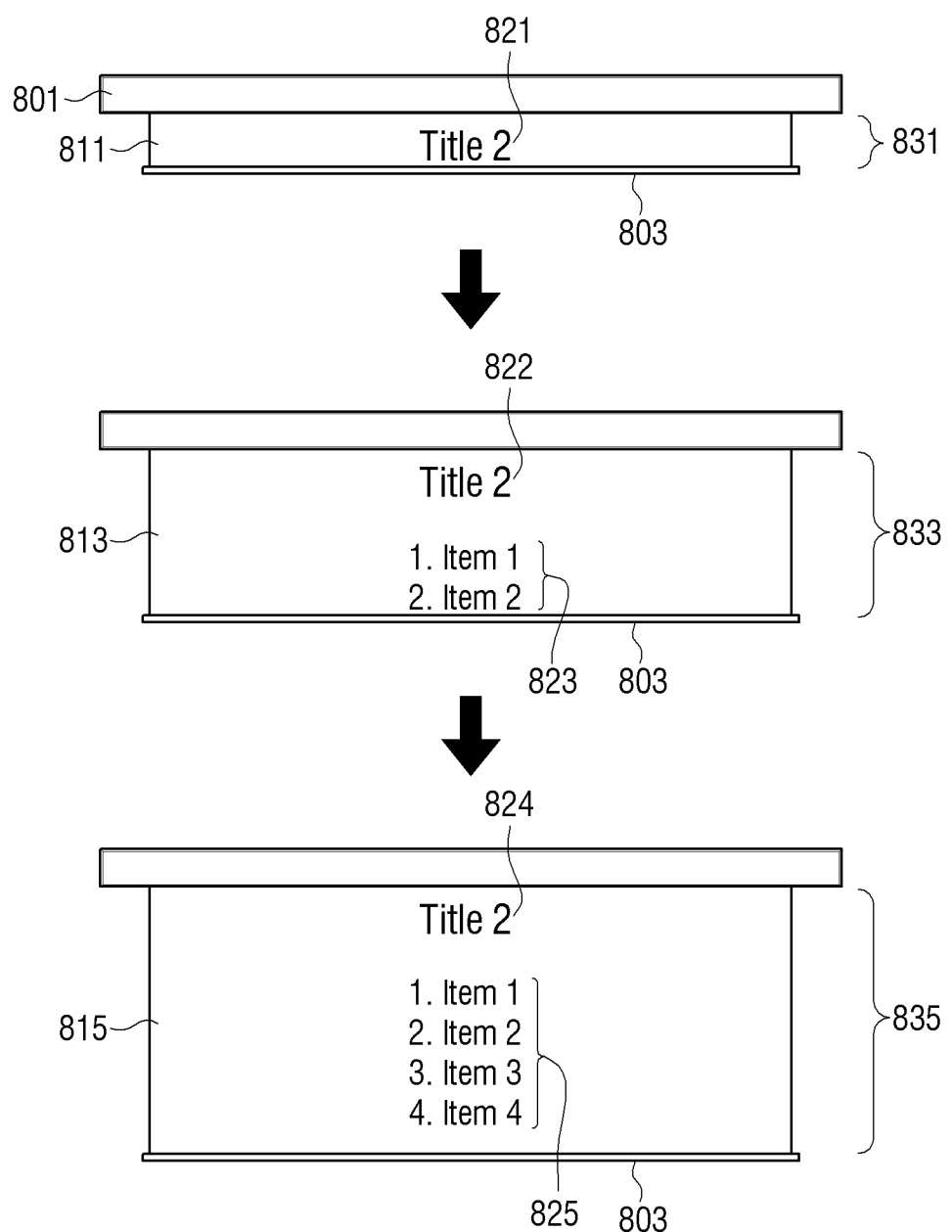

FIGS. 7 and 8 are views illustrating a process of displaying content on the flexible display 703 as the flexible display 703 is withdrawn or retracted from the electronic device 100 according to another exemplary embodiment.

FIG. 7 illustrates content display screens 711, 713, and 715 with the main body 701 and flexible display 703 being withdrawn or retracted. That is, the display area of the flexible display 703 may gradually expand, and accordingly, the content may be displayed on the display area as it expands.

The controller 105 may determine whether to display the content on the flexible display 703 from the top end or from the bottom end depending on the attributes of the content. The attributes of the content may be for example, a list of videos, still images, prioritized plurality of items, and a list that includes a plurality of items. In an exemplary embodiment, the content is displayed from the top end or a bottom end based on determined attributes of the content.

For example, where the attributes of the content include a prioritized plurality of items, the controller 105 may control the flexible display 703 to first display a title of the list, and then the content from the bottom end as the flexible display 730 is withdrawn or retracted. That is, the controller 105 may control the flexible display 703 to display the content while moving the content in the same direction as the withdrawal or retraction direction of the flexible display 703 after the title of the list is displayed on the flexible display 703.

In the first view of FIG. 7, the flexible display 703 is partially withdrawn or retracted in a downward direction. A part of the content 711 may be displayed on the flexible display 703. For example, a title of a prioritized list may be displayed on the flexible display 703.

In the second view of FIG. 7, the flexible display 703 is further withdrawn or retracted in a downward direction. A part of the content 713 may be displayed on the flexible display 703. For example, on the flexible display 703, some of the items in the prioritized list may be displayed starting from the least prioritized items. In response to the priority of the items being item 1, item 2, item 3, and item 4, on the display area, item 4 may be displayed and then item 3 may be displayed.

In the third view of FIG. 7, the flexible display 703 is completely withdrawn or retracted from the main body 701, and the entire display area is exposed to the outside. On the display area of the flexible display 703, the entire content 715 may be displayed. For example, on the flexible display 703, an item of the prioritized list or all items may be displayed. According to an exemplary embodiment, the order of displaying the items may be item 4→item 3→item 2→item 1. That is, after the title is displayed, as the flexible display 703 is withdrawn or retracted, the controller 105 may control the flexible display 703 to display the content while moving it in the same direction as the withdrawal or retraction direction of the flexible display 703.

FIG. 8 is a view illustrating content display screens 811, 813, 815 according to a withdrawal or retraction state of the flexible display 803 and the main body 801 according to an exemplary embodiment. That is, the display area of the flexible display 803 may gradually expand, and accordingly, the content being displayed on the display area may be displayed while gradually expanding.

The controller 105 may determine whether to display the content from the top end or from the bottom end on the flexible display 803 according to the attributes of the content. The attributes of the content may be a list that includes video, still image, and a plurality of prioritized items, or a list that includes a plurality of un-prioritized items, according to an exemplary embodiment.

For example, in response to the attributes of the content including a plurality of un-prioritized items, the controller 105 may display the flexible display 803 to display the content as the flexible display 803 is withdrawn or retracted. That is, the controller 105 may control the flexible display 803 to display the content while moving the content in the same direction as the withdrawal or retraction direction of the flexible display 803.

In the first view of FIG. 8, the flexible display 803 is partially exposed in a downward direction. On the flexible display 803, a part of the content 811 may be displayed in a display area 831. For example, a title of an un-prioritized list may be displayed on the flexible display 803.

In the second view of FIG. 8, the flexible display 803 is further withdrawn or retracted in a downward direction. On the flexible display 803, a part of the content 813 may be displayed in a display area 833. For example, on the flexible display 803, a part of the items in the unprioritized list may be displayed. In response to the order of the items being item 1, item 2, item 3, and item 4, the items may be displayed on the display area in the order of item 1→item 2.

In the third view of FIG. 8, the flexible display 803 is completely withdrawn or retracted from the main body 801, and the entirety of display area 835 is exposed to the outside. On the display area 835 of the flexible display 803, the entire content 815 may be displayed. For example, on the flexible display 803, the title of the un-prioritized lists and all items may be displayed. According to an exemplary embodiment, all the items may be displayed in the order of item 1→item 2→item 3→item 4. That is, the controller 105 may control the flexible display 803 to display the content while moving the content in an opposite direction to the withdrawal or retraction direction of the flexible display 803 as the flexible display 803 is withdrawn or retracted.

Figure 9:
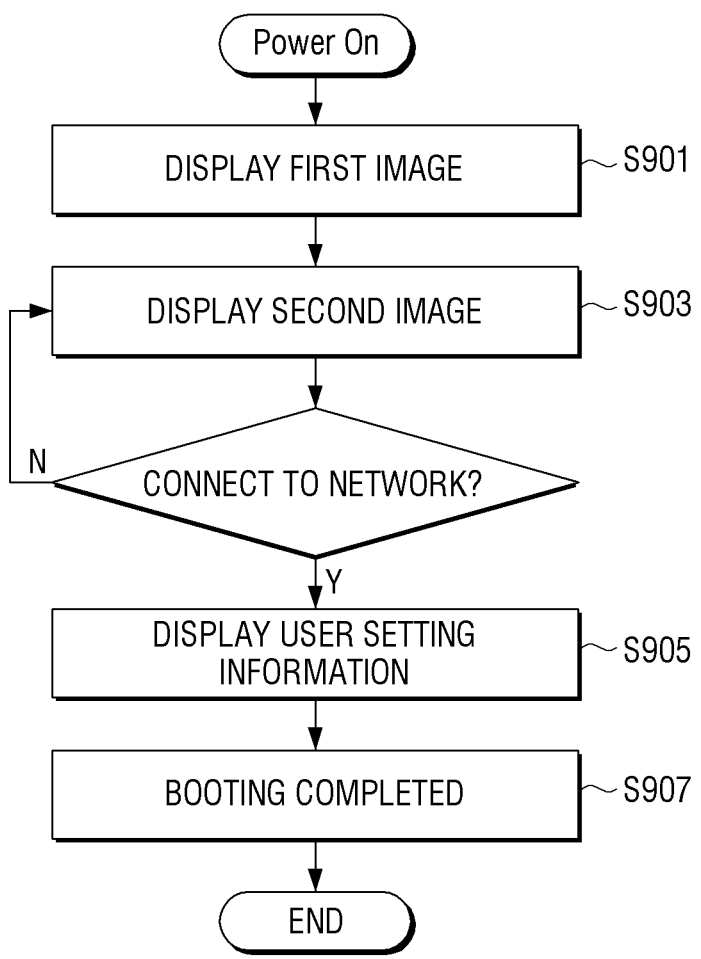
FIG. 9 is a flowchart illustrating a process of displaying an image in response to an electronic device being turned on according to another exemplary embodiment.

FIG. 9 is a flowchart illustrating a turn on process of the electronic device 100 according to another exemplary embodiment.

In response to the electronic device 100 being turned on, the electronic device 100 may display a first image on the flexible display 103 (in operation S901). According to an exemplary embodiment, a first image may be a booting image being displayed during a booting period of the electronic device 100. The booting image may be an image of a logo of a manufacturer or an image predetermined by a user. For example, in response to the electronic device 100 being turned on and a booting being started, the electronic device 100 may display a logo image.

Furthermore, in response to the power being turned on, the electronic device 100 starts to withdraw or retract the flexible display 103 from the main body 101. As the flexible display 103 is withdrawn or retracted from the main body 101, a part of the booting image may be displayed on the flexible display 103. When the booting of the electronic device 100 proceeds, the electronic device 100 may display a second image on the flexible display 103 (in operation S903). The second image may be EPG (Electronic Program Guide) data, a to-do list of the user, schedule data of the user, or an image set by the user, by way of an example and not by way of a limitation. According to an exemplary embodiment, the EPG data may be EPG data that was synchronized during a latest operation.

Then, the electronic device 100 may check a network connection (in operation S905). In response to being connected to the network, the electronic device 100 may display user setting information on the flexible display 103 (in operation S907). According to an exemplary embodiment, the user setting information may be information that the user pre-stored such as real time search words or real time viewing rate and the like.

In response to the booting being completed, the electronic device 100 may perform a normal operation (in operation S907). As the booting is completed, the flexible display 103 may be withdrawn or retracted from the main body 101. In an exemplary embodiment, as the booting is completed, the flexible display 103 may be fully retracted from the main body.

Figure 10:
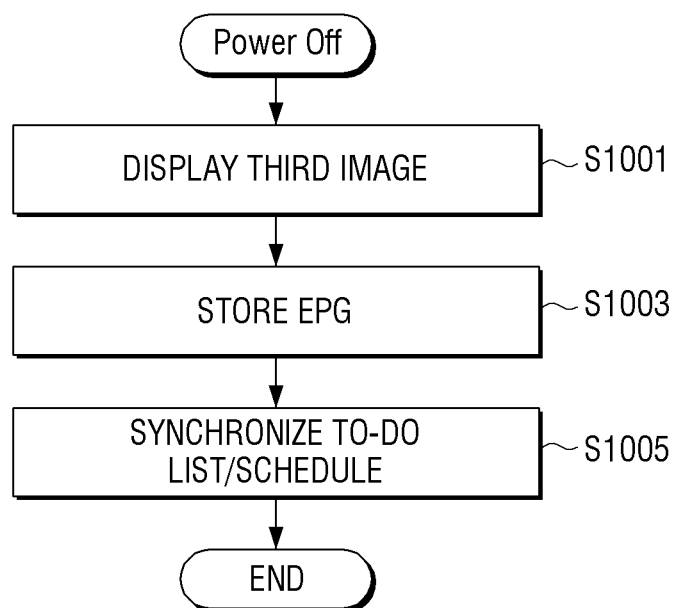
FIG. 10 is a flowchart illustrating a process of displaying an image in response to an electronic device being turned off according to another exemplary embodiment.

FIG. 10 is a flowchart illustrating a process that is performed in response to power of the electronic device being turned off according to another exemplary embodiment.

In response to the power of the electronic device 100 being turned off, the electronic device 100 starts rolling the flexible display 103 back into the main body 101. According to an exemplary embodiment, a third image may be displayed on the flexible display 103 (in operation S1001). The third image may be an image predetermined when the electronic device 100 was manufactured, or an image set by the user.

The electronic device 100 may store EPG data while the flexible display 103 is being rolled back into the main body 101 (in operation S1003). Furthermore, the electronic device 100 may synchronize the to-do list or schedule (in operation S1005).

Figure 11:
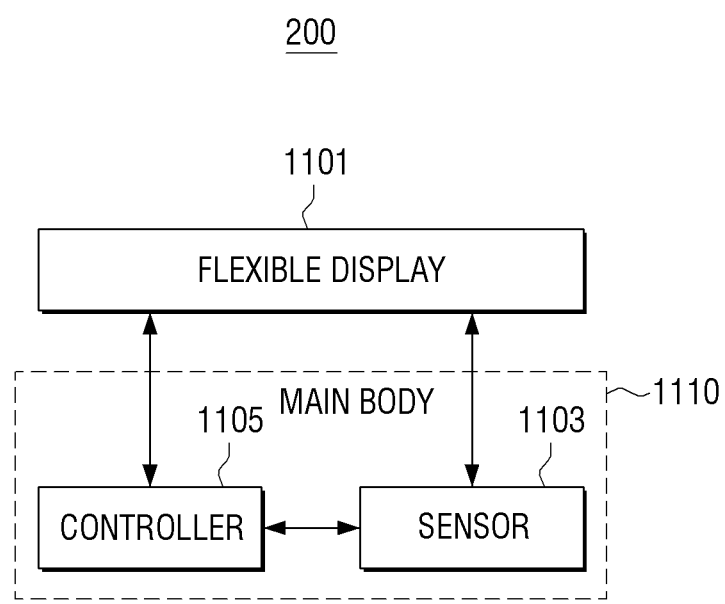
FIG. 11 is a block diagram of an electronic device according to another exemplary embodiment.

FIG. 11 is a block diagram of the electronic device 200 according to another exemplary embodiment. FIG. 11 illustrates the flexible display 1101 and main body 1110. The main body 1110 may include a controller 1105 and sensor 1103. Furthermore, the main body 1110 may be provided with an accommodating space for accommodating the flexible display 1101.

The flexible display 1101 may be rolled into the main body 1110 or mounted such that it is withdrawable or retractable from the main body 1110. The flexible display 1101 may be withdrawn or retracted manually from the main body 1110. In response to the flexible display 1101 being withdrawn from the main body 1110, the display area may be exposed to the outside. A size of the display area may change according to an amount of withdrawal or retraction of the flexible display 1101 from the main body 1110.

The sensor 1103 may sense a withdrawal or retraction and/or an amount of withdrawal or retraction of the flexible display 1101. The sensor 1103 may include an optic sensor, a gyro sensor, and a proximity sensor. The optic sensor may be a barcode sensor, and the optic sensor may recognize a barcode printed on the flexible display 1101 and sense the withdrawal or retraction and an amount of withdrawal or retraction of the flexible display 1101.

Furthermore, the optic sensor may recognize a color pattern or black and white pattern printed on the flexible display 1101, and sense the withdrawal or retraction and/or an amount of withdrawal or retraction of the flexible display 1101. The gyro sensor may be mounted on the flexible display 1101, and according to the amount of withdrawal or retraction of the flexible display 1101, a signal output from the gyro sensor may change.

The controller 1105 may control overall operations of the electronic device 200, and determine an amount of withdrawal or retraction of the flexible display 1101 based on the signal output from the sensor. The controller 1105 may control the electronic device 200 such that the content being displayed on the flexible display 1101 is scrolled in an opposite direction of the withdrawal or retraction direction of the flexible display 1101 based on the amount of withdrawal or retraction of the flexible display 1101. As the flexible display 1101 is withdrawn or retracted, a size of the display area of the flexible display 1101 changes. The controller 1105 may measure the amount and speed of withdrawal or retraction of the flexible display 1101 based on the signal being output from the sensor 1103. The controller 1105 may scroll the content being displayed on the flexible display 1101 in an opposite direction to the withdrawal or retraction direction of the flexible display 1101 based on the amount and speed of the withdrawal or retraction of the flexible display 1101. For example, in response to the flexible display 1101 being withdrawn or retracted in a downward direction, the controller 1105 may scroll the content being displayed on the flexible display 1101 in an upward direction, that is an opposite direction to the withdrawal or retraction direction of the flexible display 1101. Herein, the scroll speed of the content may be proportionate to the speed of withdrawal or retraction of the flexible display 1101.

FIGS. 12 to 15 are views illustrating content being displayed on a display as a flexible display of an electronic display 200 is withdrawn or retracted according to another exemplary embodiment.

Figure 12:
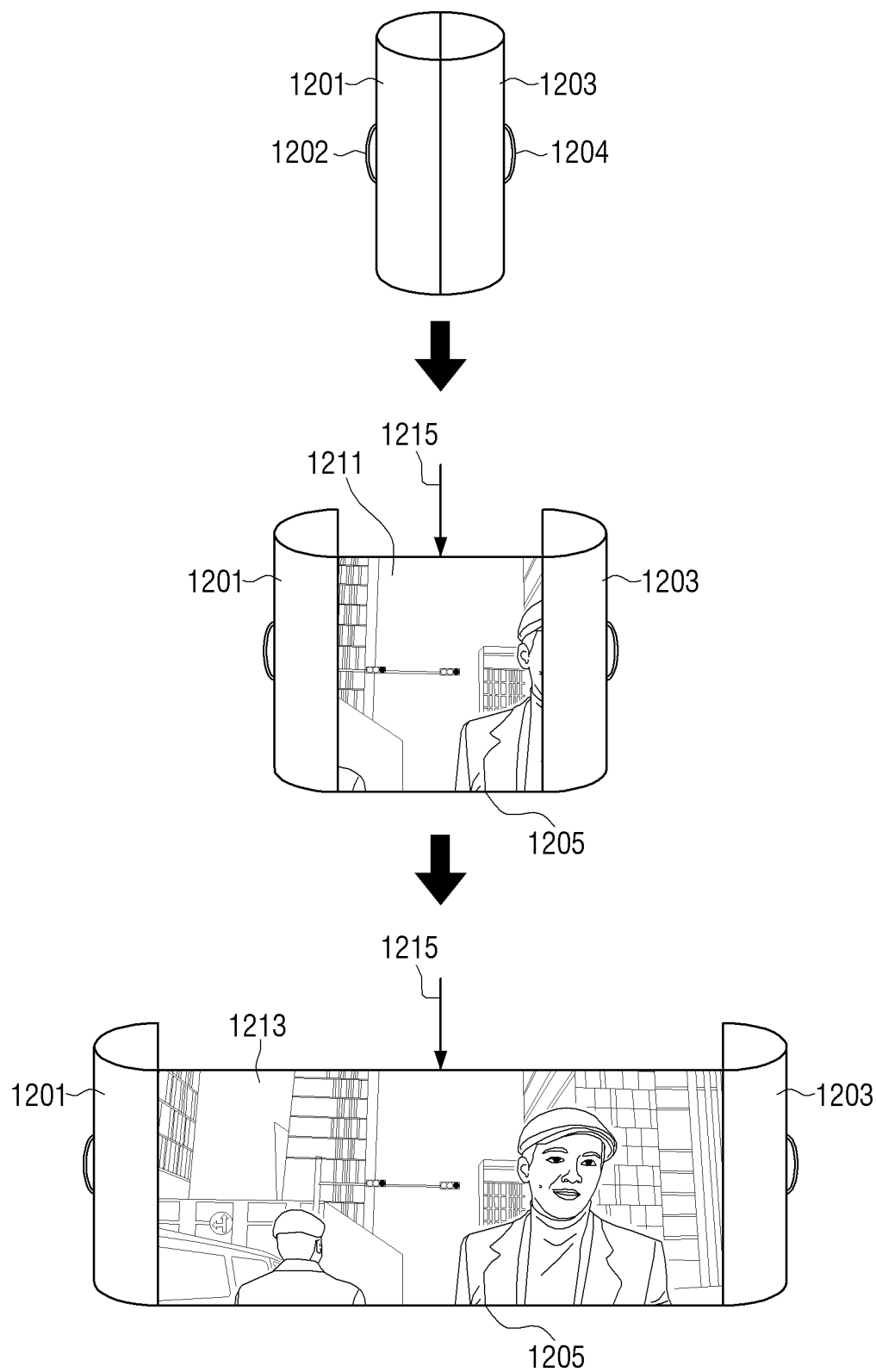
FIGS. 12, 13, 14, and 15 are views illustrating content being displayed on a display area as a flexible display of an electronic device is being withdrawn or retracted according to yet another exemplary embodiment.

FIG. 12 illustrates an electronic device 200, main body having a first main body part 1201 and a second main body part 1203, and flexible display 1205, according to an exemplary embodiment. The electronic device 200 may be a mobile apparatus. The electronic device 200 may have a cylindrical or a polygonal cylindrical shape of its main body 1201 and 1203 and the flexible display 1205. As the electronic device 200 i.e., the body parts 1201 and 1203 are gradually separated from each other, the flexible display 1205, inside the main body 1201 and 1203, may be exposed. The main body may include a first main body part 1201 and a second main body part 1203. A first part of the flexible display may be rolled around the first main body part 1201, and a second part of the flexible display 1205 may be rolled around the second main body part 1203.

The first main body part 1201 may include a handle 1202 configured to withdraw or retract the flexible display 1205. The second main body part 1203 may include a handle 1204 so that the flexible display 1205 may be withdrawn easily. By the user grasping the handle 1202, 1204 and pulling the main body parts 1201 or 1203 to the left or right, the flexible display 1205 may be withdrawn or retracted. If the electronic device 200 does not have an additional driver for withdrawing or retracting the flexible display 1205, the user may withdraw or retract the flexible display 1205 from the main body 1201, 1203 using the handle 1202, 1204.

As the flexible display 1205 is withdrawn or retracted from the main body 1201, 1203, the display area may be exposed or open to the outside. In response to the flexible display 1205 starting to be exposed or open to the outside, the controller 1105 may control the flexible display 1205 to display the content 1211 on the exposed or open display area. According to an exemplary embodiment, the content being displayed on the display area may be a part of the entire content.

The controller 1105 may determine a central position 1215 of the currently exposed or open flexible display 1205 based on a signal output from the sensor 1103, and control the flexible display 1205 to display the content 1213 based on the central position 1215. That is, the controller 1105 may control the flexible display 1205 to display the content such that a central part of the content coincides with the central position of the flexible display 1205. Furthermore, the controller 1105 may determine a left withdrawal speed at which the flexible display 1205 is withdrawn from the main body part 1201 and a right withdrawal speed at which the flexible display 1205 is withdrawn from the main body part 1203 based on the signal output from the sensor 1103, and control the flexible display 1205 to display the content such that the content expands from the center to the left and right at the left withdrawal speed and right withdrawal speed. According to an exemplary embodiment, the speed with which the content is displayed as it expands may be different between the left side and the right side.

When the flexible display is being withdrawn or retracted from the main body 1201, 1203, the left speed at which the left part of the flexible display 1205 is withdrawn or retracted from the first main body part 1201 and the right speed at which the right part is withdrawn or retracted from second main body part 1203 may be different from each other, and an amount of withdrawal or retraction may also be different or vary between the left side and the right side. Even if the amount of withdrawal or retraction of the flexible display 1205 is different between the left side and the right side, the controller 1105 may determine the central position 1215 based on the currently exposed display area or display area that is open to the outside, and display the content with its center corresponding to the central position 1215.

Figure 13:
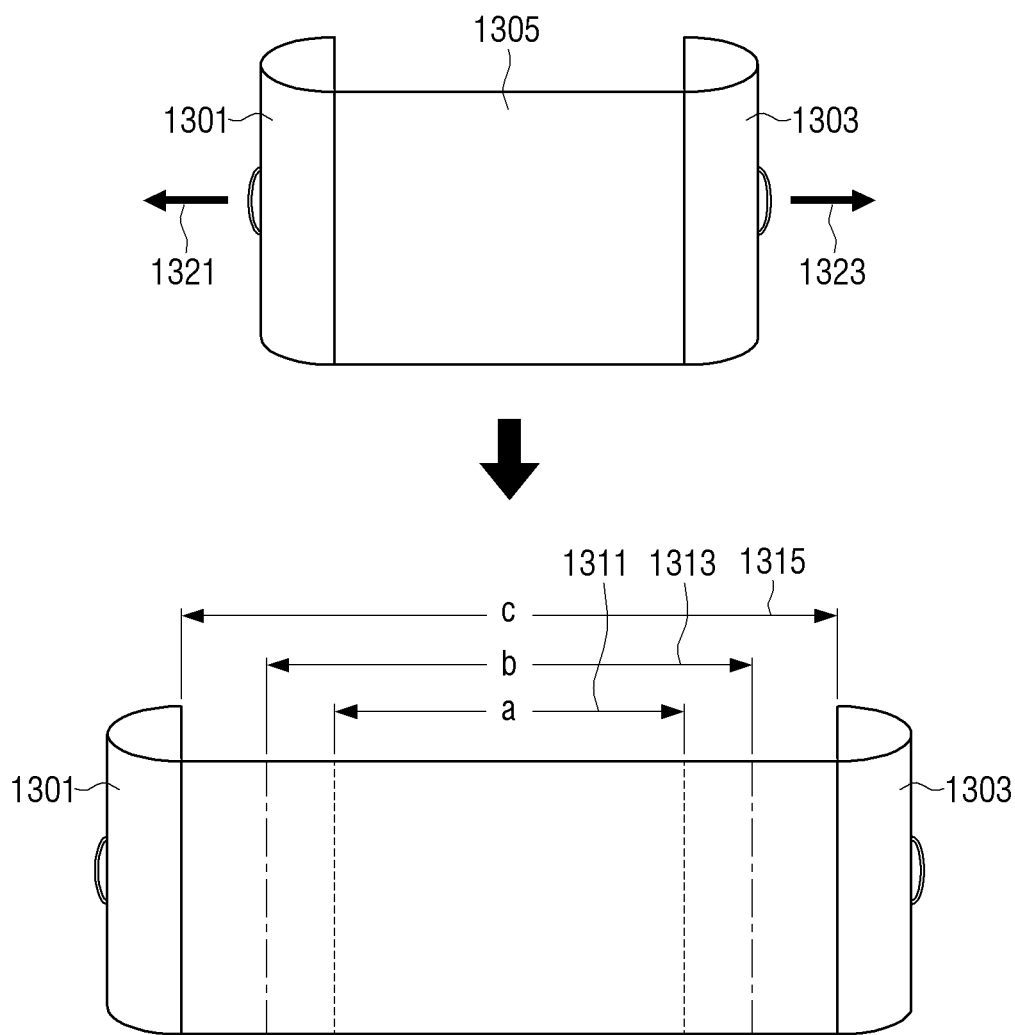

FIG. 13 is a view illustrating a main body and a flexible display of an electronic apparatus according to another exemplary embodiment. The electronic device 200 may be a mobile device. The main body may include a first main body part 1301 and a second main body part 1303. In response to the user pulling the first main body part 1301 and the second main body 1303 to the left and right 1321, 1323, the flexible display 1305 may be withdrawn or retracted from the main body 1301, 1303.

As the flexible display 1305 is withdrawn or retracted from the main body 1301, 1303, the display area may expand and the width to length ratio of the display area may change. In response to the width and length ratio of the display area corresponding to the threshold value, the controller 1105 may provide feedback corresponding to the threshold value. The feedback may be a visual feedback, auditory feedback and/or tactile feedback. The controller 1105 may provide feedback in response to the display area of the flexible display 1305 expanding and the width and length ratio of the display area being a (1311), b (1313), and c (1315).

For example, in response to the display area of the flexible display 1305 expanding and the width and length ratio of the display area being 4:3, the controller 1105 may display on the display area a line corresponding to 4:3, generate a sound or provide a haptic feedback. In response to the displaying area expanding continuously, and the width and length ratio of the display area being 16:9, the controller 1105 may display on the display area a line corresponding to 16:9, generate a sound or provide a haptic feedback. In response to the display area expanding continuously and the width and length ratio of the display area being 21:9, the controller 1105 may display on the display area a line corresponding to 21:9, generate a sound or provide a haptic feedback.

Figure 14:
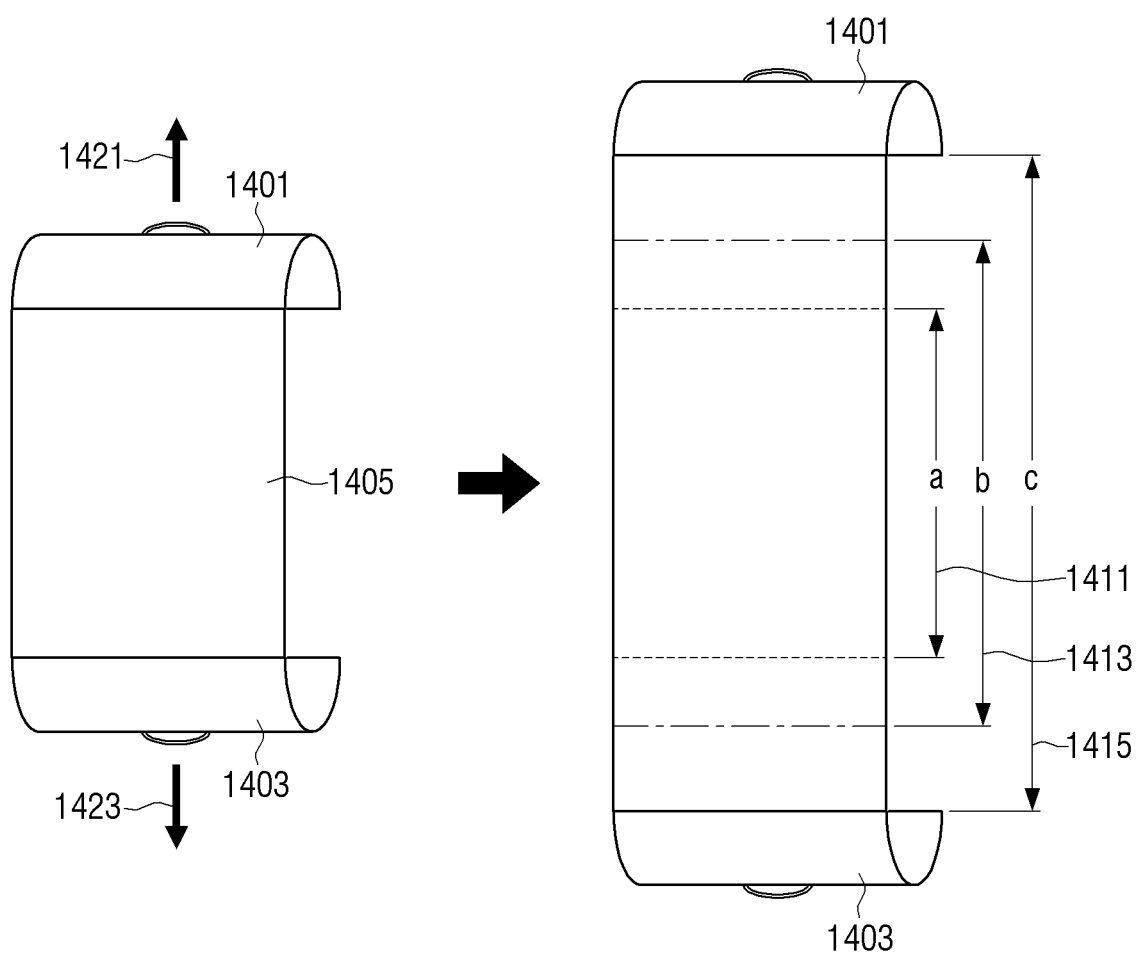

FIG. 14 is a view illustration a main body and a flexible display of an electronic apparatus according to another exemplary embodiment. The electronic device 200 may be a mobile apparatus. The main body may include a top main body part 1401 and bottom main body part 1403. In response to the user pulling the top main body part 1401 and bottom main body part 1403 in an up direction 1421 and down direction 1423, respectively, the flexible display 1405 may be withdrawn or retracted from the main body.

As the flexible display 1405 is withdrawn or retracted from the main body 1401, 1403, the display area may expand and the width and length ratio of the display area may change. In response to the width and length ratio of the display area coinciding with the threshold value, the controller 1105 may provide feedback corresponding to the threshold value. The feedback may be a visual feedback, an auditory feedback and/or a tactile feedback. In response to the display area of the flexible display 1405 gradually expanding and the width and length ratio of the display ratio being a (1411), b (1413) and c (1415), the controller 1105 may provide feedback, respectively.

For example, in response to the display area of the flexible display expanding and the width and length ratio of the display area being 3:4, the controller 1105 may display on the display area a line corresponding to 3:4, generate a sound or a haptic feedback. In response to the display area expanding continuously, and the width and length ratio of the display area being 9:16, the controller 1105 may display on the display area a line corresponding to 9:16, generate a sound or provide a haptic feedback. In response to the display area further expanding and the width and length ratio of the display area being 9:21, the controller 1105 may display on the display area a line corresponding to 9:21 or generate a sound or provide a haptic feedback.

Figure 15:
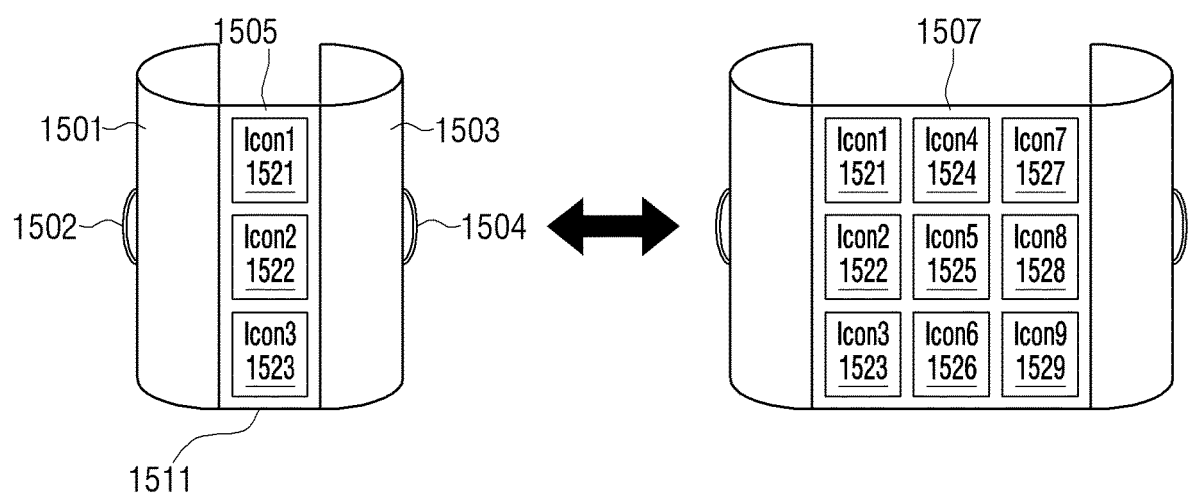

FIG. 15 is a view illustrating an electronic apparatus 200 having a main body and a flexible display with a display area displaying icons according to another exemplary embodiment. The electronic device 200 may be a mobile device. The electronic device 200 may have a cylindrical or a polygonal cylindrical shape through the main body 1501, 1503 and the flexible display 1511, and as the electronic device 200 is separated into a first main body part 1501 and a second main body part 1503, the flexible display 1511 inside the main body 1501, 1503 may be exposed or open to the outside. The main body may include the first main body part 1501 and the second main body part 1503. A first part of the flexible display 1511 may be rolled around the first main body part 1501, and a second part of the flexible display 1511 may be rolled around the second main body part 1503.

The first main body part 1501 may include a handle 1502 configured to withdraw or retract the flexible display 1511. The second main body part 1503 may include a handle 1504 so that the flexible display 1511 may be withdrawn or retracted easily. By the user grasping the handle 1502, 1504 pulling the main body 1501, 1503 to left or right, the flexible display 1511 may be withdrawn or retracted from the main body. If the electronic device 200 does not have an additional driver for withdrawing or retracting the flexible display 1511, the user may withdraw or retract the flexible display 1511 from the main body 1501, 1503 using the handle 1502, 1504.

In the left view of FIG. 15, as the flexible display 1511 is withdrawn or retracted from the main body 1501, 1503, the display area 1505 may be exposed or open to the outside. On the display area 1505, content 1521, 1522, 1523 may be displayed. According to an exemplary embodiment, the content being displayed on the display area may be a part of an entire content. The content 1521, 1522, 1523 may be icons. The controller 1105 may determine an order of displaying the content on the display area based on an attribute of the content. In response to the content being an icon, the controller 1105 may display the content from a left part thereof on the display area. For example, in response to the display area 1505 of the flexible display 1511 being partially disposed or open to the outside, the controller 1105 may control the flexible display 1511 to display content

1521, 1522, 1523 corresponding to a first row on the left side of among the entire contents 1521, 1522, 1523, 1524, 1525, 1526, 1527, 1528, 1529.

As the flexible display 1511 continues to expand to left/right, the display area 1507 expands, and on the expanded display area 1507, the entire content 1521, 1522, 1523, 1524, 1525, 1526, 1527, 1528, 1529 may be displayed.

Figure 16A:
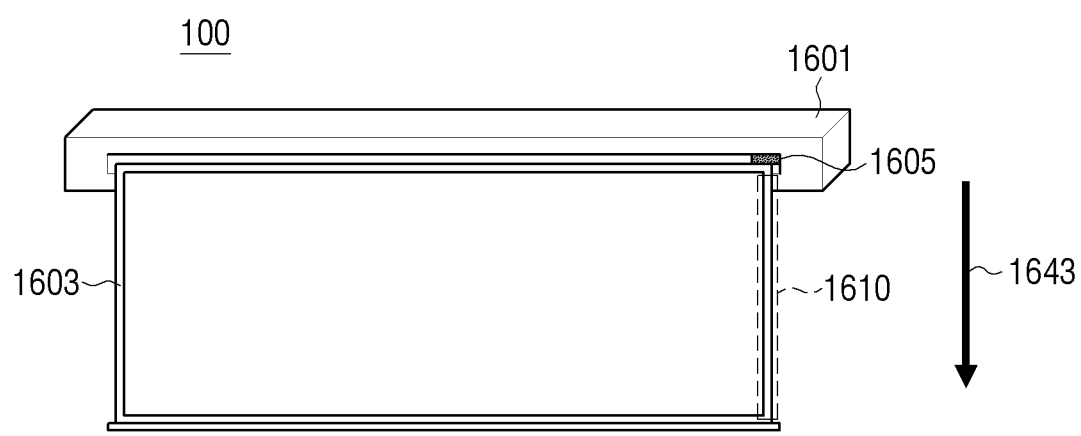
FIGS. 16A and 16B are views illustrating sensing an amount of withdrawal or retraction of a flexible display using a pattern according to an exemplary embodiment.
Figure 16B:
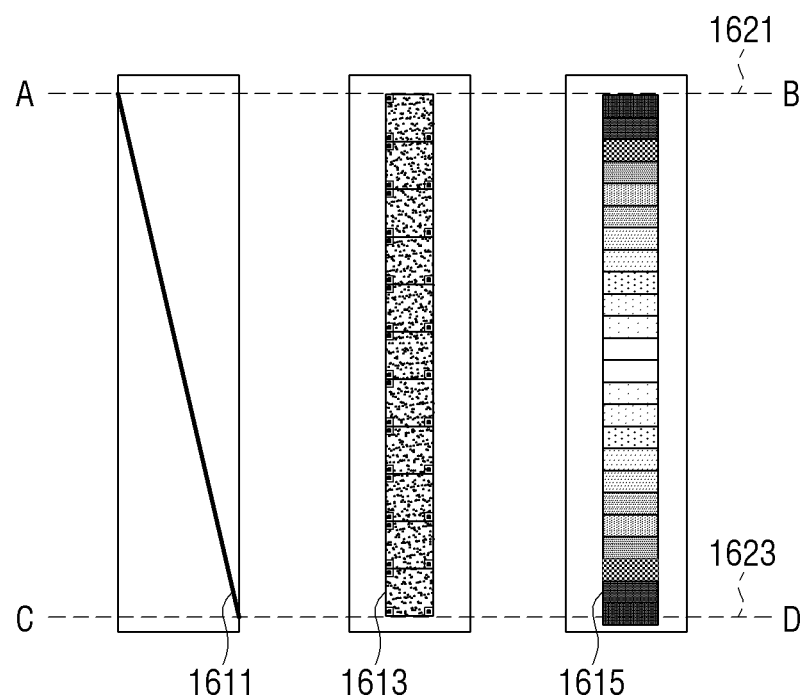

FIGS. 16A and 16B are views illustrating sensing an amount of withdrawal or retraction of a flexible display using a pattern according to an exemplary embodiment.

FIG. 16A is a view illustrating a main body 1601, flexible display 1603, and a sensor 1605 according to an exemplary embodiment. The flexible display 1603 may be rolled into the main body or withdrawn or retracted outside of the main body. A withdrawal or retraction direction of the flexible display may be a downward direction 1643. The sensor 1605 may be an optic sensor, and the optic sensor may sense the pattern 1610 printed on the flexible display. The pattern 1610 may be a QR code, barcode, black and white pattern or color pattern that corresponds to a pixel line of the flexible display 1603. As the flexible display 1603 is withdrawn or retracted, a value of the pattern 1610 printed on the flexible display 1603 may change, and the sensor 1605 may sense an amount of withdrawal or retraction of the flexible display 1603 according to the changed value of the pattern 1610.

FIG. 16B is a view illustrating a pattern 1611, 1613, 1615 printed on the flexible display 1603. The pattern 1610 (shown in FIG. 16A) printed on the flexible display 1603 may be a diagonal line 1611, a QR code 1613, or a color pattern 1615.

The pattern 1610 may be printed on the display area of the flexible display 1603. Otherwise, the pattern 1610 may be printed on a rear surface of the flexible display 1603. Otherwise, the pattern 1610 may be displayed on the display area of the flexible display 1603. This is provided by way of an example and not by way of a limitation.

A dotted line AB 1621 is a virtual line representing that the flexible display 1603 is rolled into the main body 1601. A dotted line CD 1623 is a virtual line representing that the flexible display 1603 is completely withdrawn or retracted outside of the main body 1601.

For example, a diagonal pattern 1611 may be printed on the flexible display 1603. A position from which the diagonal pattern 1611 is sensed may change according to an amount of withdrawal or retraction of the flexible display 1603. The controller 1105 may determine an amount of withdrawal or retraction of the flexible display 1603 based on the position from which the pattern 1610 is sensed.

The pattern 1613 may be a QR code, a barcode or a marking that is differentiable, and the pattern 1613 may be printed in a different type of pattern for per pixel line. The controller 1105 may analyze a QR code signal output from the sensor 1605 and determine the amount of withdrawal or retraction of the flexible display 1603.

The pattern 1615 may be a color pattern, and a different color pattern may be printed on each position corresponding to a pixel line. The controller 1105 may analyze a color signal output from the sensor 1605, and determine an amount of withdrawal or retraction of the flexible display 1603.

Figure 17A:
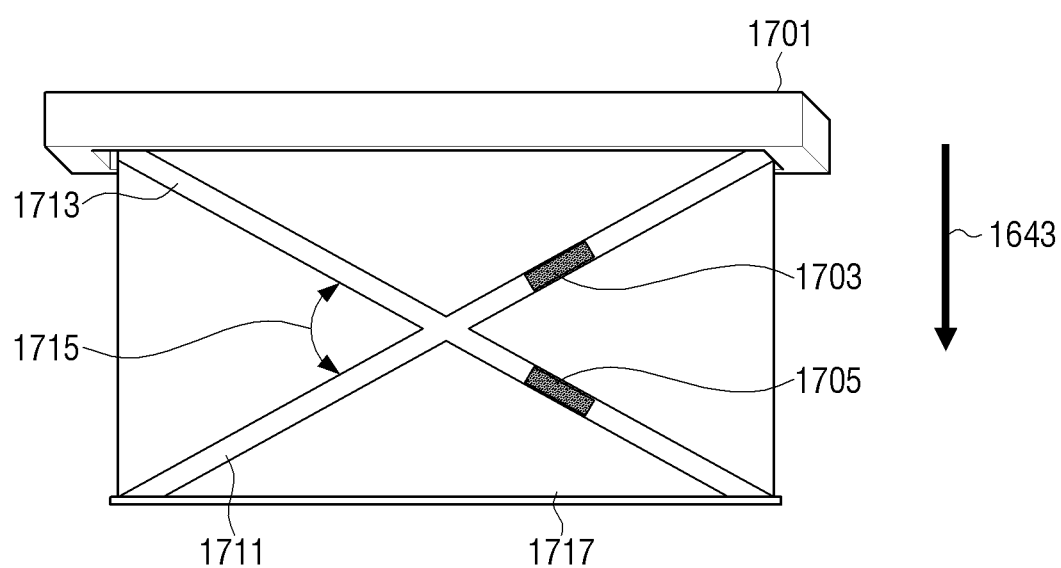
FIGS. 17A and 17B are views illustrating sensing an amount of withdrawal or retraction of a flexible display using a gyro sensor according to an exemplary embodiment.
Figure 17B:
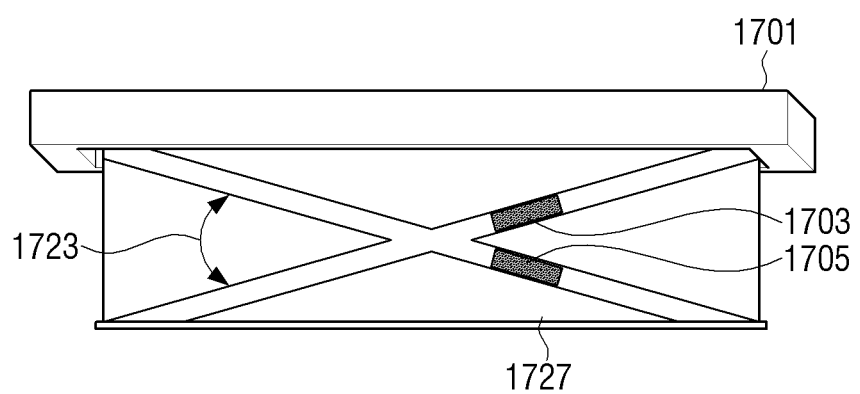

FIGS. 17A and 17B are views illustrating sensing an amount of withdrawal or retraction of the flexible display using a gyro sensor according to an exemplary embodiment.

FIG. 17A is a view illustrating a main body 1701 and a flexible display 1717. A withdrawal or retraction direction of the flexible display 1717 is a downward direction 1643. On a rear surface of the flexible display 1717, a flexible display withdrawal or retraction guide 1713, 1711, and a gyro sensor 1703, 1705 may be installed. The gyro sensor 1703 may be installed inside the withdrawal or retraction guide 1711. The gyro sensor 1703, 1705 may be installed inside the withdrawal guide 1713.

The flexible display 1717 is completely withdrawn or retracted outside of the main body 1701, and an angle 1715 between a withdrawal or retraction guide 1713 and withdrawal or retraction guide 1711 may be a maximum angle. According to an exemplary embodiment, a difference between a data value of the gyro sensor 1705 and a data value of the gyro sensor 1703 may be a maximum difference. In response to the difference between the data values of the two gyro sensors 1705, 1703 being a maximum difference, the controller 1105 may determine that the flexible display 1717 is completely withdrawn or retracted outside of the main body 1701.

FIG. 17B is a view illustrating that the flexible display 1727 is slightly withdrawn outside of the main body. According to an exemplary embodiment, an angle 1723 between the two guides is smaller than an angle 1715 between the two guides when the flexible display 1717 is completely withdrawn or retracted (as shown in FIG. 17A). Furthermore, the difference between the data values of the two gyro sensors 1705, 1703 is relatively smaller than that when the flexible display 1717 is completely withdrawn or retracted outside of the main body (as shown in FIG. 17A).

That is, the controller 1105 may determine an amount of withdrawal or retraction of the flexible display 1727 from the difference of data values of the two gyro sensors 1705, 1703. Furthermore, the controller 1105 may determine a withdrawal or retraction speed or rolling speed of the flexible display 1727 based on an amount of change of the difference of data values of the two gyro sensors 1705, 1703. Furthermore, the controller 1105 may determine a withdrawal speed or rolling speed of the flexible display 1727 from an amount of change of a difference of data values of the two gyro sensors 1705, 1703.

Figure 18A:
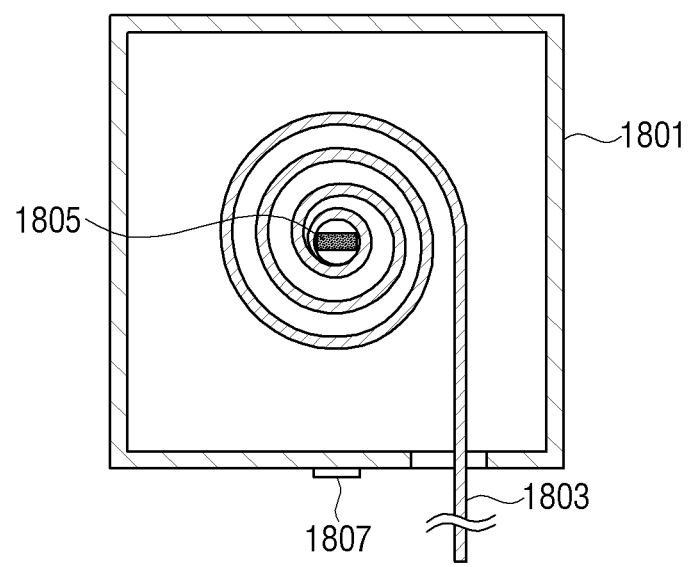
FIGS. 18A and 18B are views illustrating sensing an amount of withdrawal or retraction of a flexible display using a gyro sensor and proximity sensor according to an exemplary embodiment.
Figure 18B:
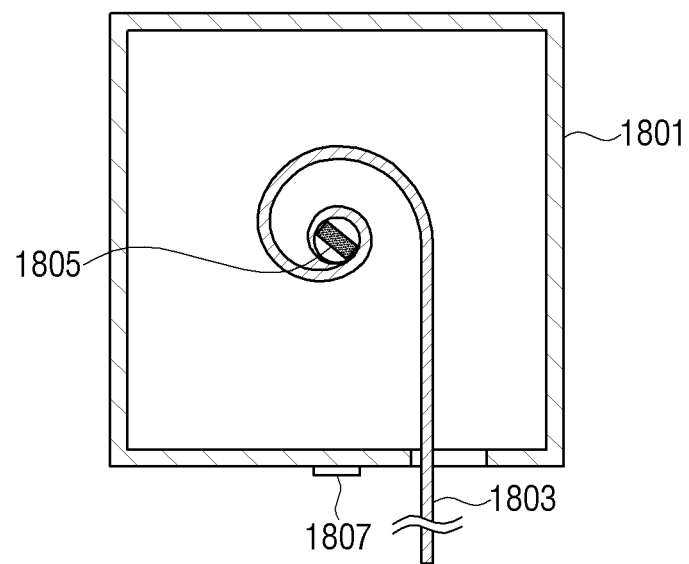

FIGS. 18A and 18B are views illustrating sensing an amount of withdrawal or retraction of a flexible display using a gyro sensor and a proximity sensor according to an exemplary embodiment. These figures illustrate a cross-sectional view of a main body according to an exemplary embodiment.

FIG. 18A is a view illustrating a main body 1801, a flexible display 1803, a gyro sensor 1805, and a proximity sensor 1807, according to an exemplary embodiment. The flexible display 1803 is rolled into the main body 1801. The flexible display 1803 may be rolled into the main body 1801 or withdrawn or retracted outside of the main body 1801 as it rotates. The gyro sensor 1805 may be installed on a rotation axis of the flexible display 1803.

The gyro sensor 1805 may be rotated as the flexible display 1803 is withdrawn, or retracted, or rolled. A signal being output from the gyro sensor 1805 changes as the gyro sensor 1805 rotates, and the controller 1105 may sense the flexible display 1803 being withdrawn or retracted or rolled based on the signal output from the gyro sensor 1805.

The proximity sensor 1807 may sense a proximity of the flexible display 1803. There is a difference between an extent of proximity of when the flexible display 1803 is completely withdrawn or retracted into the main body and an extent of proximity of when the flexible display 1803 is completely rolled or retracted outside of the main body, and an output value of the proximity sensor 1803 may change accordingly. That is, as the output value of the proximity sensor 1807 changes according to an extent of withdrawal or retraction of the flexible display 1803, the controller 1105 may determine an amount of withdrawal or retraction of the flexible display 1803 based on an output signal of the proximity sensor 1807.

Figure 19:
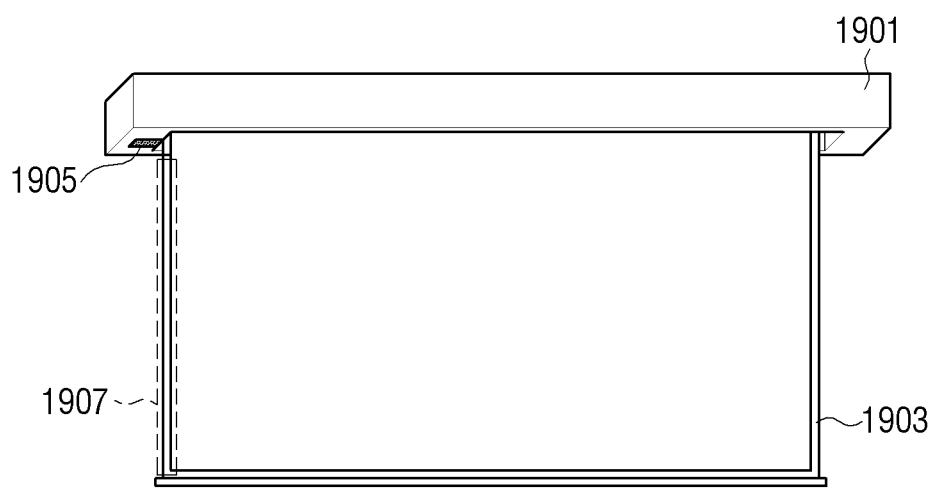
FIG. 19 is a view illustrating sensing an amount of withdrawal or retraction of a flexible display using a variable resistance according to an exemplary embodiment.

FIG. 19 is a view illustrating sensing an amount of withdrawal or retraction of the flexible display 1903 using a variable resistance according to an exemplary embodiment.

FIG. 19 is a view illustrating a main body 1901, flexible display 1903, resistance adjuster 1905, and variable resistance 1907 of an electronic apparatus, according to an exemplary embodiment. The variable resistance 1907 may be disposed or placed in the flexible display 1903. A resistance value of the resistance adjuster 1905 may change according to an amount of withdrawal or retraction of the flexible display 1903, and the controller 1105 may determine the amount of withdrawal or retraction of the flexible display 1903 based on a difference of current value that flows to the resistance adjuster 1905.

Figure 20:
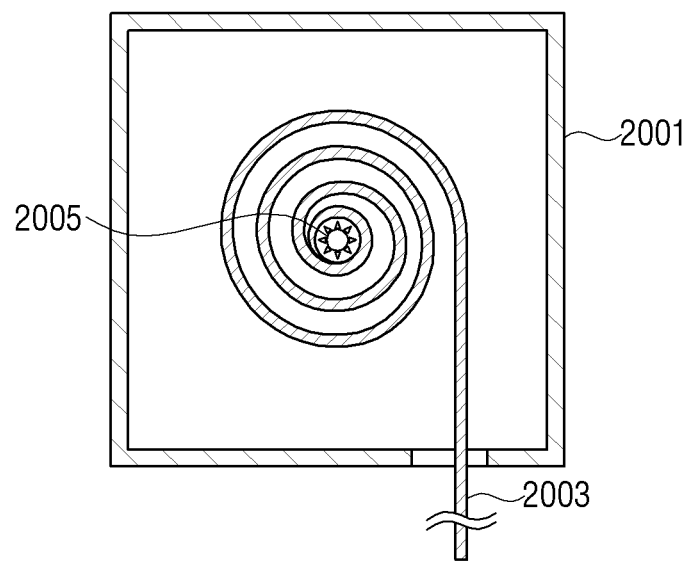
FIG. 20 is a view illustrating sensing an amount of withdrawal or retraction of a flexible display using a variable resistance according to an exemplary embodiment.

FIG. 20 is a view illustrating sensing an amount of withdrawal or retraction of the flexible display 2003 using a variable resistance according to an exemplary embodiment.

FIG. 20 is a view illustrating a main body 2001, and a flexible display 2003 of an electronic apparatus according to an exemplary embodiment. The flexible display 2003 is rolled into the main body 2001. The flexible display may be rolled into the main body 2001 or be withdrawn or retracted outside of the main body 2001 as it rotates. In a rotation axis of the flexible display 2003, a variable resistance or resistor 2005 may be installed. A resistance value of the variable resistance or resistor 2005 changes according to an amount of rotation. In response to the flexible display 2003 being withdrawn or retracted to the outside of the main body 2001 or being rolled into the main body 2001, a resistance value may change as the variable resistance or resistor 2005 installed in the rotation axis of the flexible display 2003 rotates. As the resistance value changes, a current value that passes the variable resistance or resistor 2005 may change, and the controller 1105 may determine an amount of withdrawal or retraction of the flexible display according to the current value that passes the variable resistance or resistor 2005. That is, the controller 1105 may determine the amount of withdrawal or retraction of the flexible display 2003 based on a signal output from the variable resistance or resistor 2005.

Although a few exemplary embodiments have been shown and described, it would be appreciated by those skilled in the art that changes may be made without departing from the principles and spirit of an inventive concept, the scope of which is defined in the appended claims and their equivalents. The description of exemplary embodiments is intended to be illustrative, and not to limit the scope of the claims, and many alternatives, modifications, and variations will be apparent to those skilled in the art.

What is claimed is:

1. An electronic device comprising:
   a main body;
   a flexible display to be rolled up, wherein the rolled-up flexible display is placed in the main body;
   a sensor configured to detect unrolling of the flexible display; and
   a controller configured to:
      control the flexible display to present information while the flexible display is exposed from the main body, and
      based on detecting the flexible display being rolled into the main body while the information is presented, control to change a presentation position of the information on the flexible display according to the rolling of the flexible display, wherein the controller is further configured to:
      determine a speed of the rolling of the flexible display based on a signal output from the sensor,
      determine a speed of the moving the presentation position based on the speed of the rolling, and
      determine a number of pixels for moving the presentation position based on a refresh rate in combination with the speed of the rolling.

2. The electronic device according to claim 1, further comprising:
   a motor; and
   a driver configured to drive the motor to roll the flexible display into the main body,
   wherein the controller controls the driver and the motor.

3. The electronic device according to claim 1, wherein the controller is further configured to determine an amount of rolling of the flexible display based on the signal output from the sensor, and to determine an amount of the changing of the presentation position of the information based on the determined amount of the rolling.

4. The electronic device according to claim 1, wherein, in response to the flexible display being rolled, the controller controls the flexible display to change the presentation position of the information displayed on the flexible display in an opposite direction to a direction in which the flexible display is being rolled, and to display a black screen on an area of the flexible display which has been rolled inside the main body.

5. The electronic device according to claim 1, wherein, in response to the flexible display being rolled, the controller changes the presentation position of the information displayed on the flexible display in an opposite direction to a direction in which the flexible display is being rolled, and turns off an area of the flexible display which has been rolled inside the main body.

6. A content display method of an electronic device, the content display method comprising:
   presenting information on a flexible display while the flexible display is exposed from a main body of the electronic device;
   detecting the flexible display being rolled into the main body while the information is presented; and
   changing a presentation position of the information on the flexible display according to the rolling of the flexible display,.
   wherein the changing the presentation position further comprises:
      determining a speed of the rolling of the flexible display based on a signal output from a sensor,
      determining a speed of the moving the presentation position based on the speed of the rolling, and
      determining a number of pixels for moving the presentation position based on a refresh rate in combination with the speed of the rolling.

7. The content display method according to claim 6, further comprising:
   determining an amount of the rolling of the flexible display; and
   determining an amount of the changing of the presentation position of the information based on the determined amount of the rolling.

8. The content display method according to claim 6, wherein the changing comprises changing the presentation position of the information displayed on the flexible display in an opposite direction to a direction in which the flexible display is being rolled.

9. The content display method according to claim 8, further comprising displaying a black screen on an area of the flexible display which is inside the main body.

10. The content display method according to claim 8, further comprising turning off an area of the flexible display which is inside the main body.

* * * * *